US007693588B2

(12) United States Patent
Hong et al.

(10) Patent No.: US 7,693,588 B2
(45) Date of Patent: Apr. 6, 2010

(54) METHOD OF CURVATURE CONTROLLED DATA SMOOTHING

(75) Inventors: Jiawei Hong, Brooklyn, NY (US); Xiaonan Tan, Brooklyn, NY (US)

(73) Assignee: Hurco Companies, Inc., Indianapolis, IN (US)

( * ) Notice: Subject to any disclaimer, the term of this patent is extended or adjusted under 35 U.S.C. 154(b) by 495 days.

(21) Appl. No.: 11/277,286

(22) Filed: Mar. 23, 2006

(65) Prior Publication Data
US 2007/0085850 A1 Apr. 19, 2007

Related U.S. Application Data

(60) Provisional application No. 60/664,398, filed on Mar. 23, 2005.

(51) Int. Cl.
*G05B 19/18* (2006.01)
(52) U.S. Cl. .................. 700/61; 700/187; 700/189; 700/192
(58) Field of Classification Search .................. 345/474; 700/33, 44, 61, 98, 159–161, 164, 186–189, 700/192, 252; 702/94, 95, 155, 157, 158, 702/168
See application file for complete search history.

(56) References Cited

U.S. PATENT DOCUMENTS

| 3,576,979 | A | 5/1971 | McCall et al. |
| 3,602,090 | A | 8/1971 | Whetham |
| 3,679,955 | A | 7/1972 | Rhoades |
| 3,728,595 | A | 4/1973 | Adams |
| 3,838,258 | A | 9/1974 | Logan |
| 3,849,712 | A | 11/1974 | Lankford et al. |
| 3,860,805 | A | 1/1975 | Strukel |
| 3,882,304 | A | 5/1975 | Walters |
| 4,130,788 | A | 12/1978 | Fiegehen et al. |
| 4,131,837 | A | 12/1978 | Whetham |
| 4,208,718 | A | 6/1980 | Chung |
| 4,415,867 | A | 11/1983 | Rubin |
| 4,433,382 | A | 2/1984 | Cunningham et al. |
| 4,477,754 | A | 10/1984 | Roch |
| 4,490,781 | A | 12/1984 | Kishi et al. |
| 4,501,998 | A | 2/1985 | Nozawa et al. |
| 4,503,493 | A * | 3/1985 | Burkhardt et al. ........... 700/190 |
| 4,542,471 | A | 9/1985 | Inaba et al. |

(Continued)

FOREIGN PATENT DOCUMENTS

JP 57114325 7/1982

(Continued)

OTHER PUBLICATIONS

Song et al., "An efficient evolutionary optimization framework applied to turbine blade firtree root local profiles", School of Engineering Sciences, University of Southhampton, United Kingdom, Published online Oct. 26, 2004.*

(Continued)

*Primary Examiner*—Paul L Rodriguez
*Assistant Examiner*—Carlos Ortiz Rodriguez
(74) *Attorney, Agent, or Firm*—Baker & Daniels LLP

(57) ABSTRACT

The present invention relates to navigation of a path by a moving object, and, more particularly, to motion control systems for computer-controllable machine tools.

27 Claims, 23 Drawing Sheets

U.S. PATENT DOCUMENTS

| | | | |
|---|---|---|---|
| 4,543,625 A | 9/1985 | Nozawa et al. | |
| 4,571,686 A | 2/1986 | Torisawa | |
| 4,590,573 A | 5/1986 | Hahn | |
| 4,616,326 A | 10/1986 | Meier et al. | |
| 4,626,756 A | 12/1986 | Inaba et al. | |
| 4,635,206 A | 1/1987 | Bhatia et al. | |
| 4,648,024 A * | 3/1987 | Kato et al. | 700/187 |
| 4,663,726 A | 5/1987 | Chand et al. | |
| 4,723,203 A | 2/1988 | Kishi et al. | |
| 4,728,872 A | 3/1988 | Kishi et al. | |
| 4,739,488 A | 4/1988 | Asakura | |
| 4,750,105 A | 6/1988 | Ohkawa et al. | |
| 4,763,276 A | 8/1988 | Perreirra et al. | |
| 4,797,825 A | 1/1989 | Shimanuki et al. | |
| 4,833,617 A | 5/1989 | Wang | |
| 4,835,710 A | 5/1989 | Schnelle et al. | |
| 4,878,172 A | 10/1989 | Matsumura | |
| 4,884,373 A | 12/1989 | Suzuki et al. | |
| 4,901,220 A | 2/1990 | Matsumura et al. | |
| 4,907,164 A * | 3/1990 | Guyder | 700/173 |
| 4,908,555 A | 3/1990 | Ikeda et al. | |
| 4,926,311 A | 5/1990 | Matsumura et al. | |
| 4,947,336 A | 8/1990 | Froyd | |
| 4,959,597 A | 9/1990 | Kawamura et al. | |
| 4,963,805 A | 10/1990 | Suzuki et al. | |
| 4,973,895 A | 11/1990 | Torii et al. | |
| 5,005,135 A * | 4/1991 | Morser et al. | 700/193 |
| 5,028,855 A | 7/1991 | Distler et al. | |
| 5,060,164 A | 10/1991 | Yoneda et al. | |
| 5,062,755 A | 11/1991 | Lawrence et al. | |
| 5,089,950 A | 2/1992 | Miyata et al. | |
| 5,091,861 A | 2/1992 | Geller et al. | |
| 5,117,169 A | 5/1992 | Kakino et al. | |
| 5,134,570 A | 7/1992 | Nankaku | |
| 5,177,421 A | 1/1993 | Sasaki et al. | |
| 5,179,514 A | 1/1993 | Rastegar et al. | |
| 5,198,984 A | 3/1993 | Yamaguchi et al. | |
| 5,247,447 A | 9/1993 | Korncoff et al. | |
| 5,287,049 A | 2/1994 | Olomski et al. | |
| 5,288,209 A | 2/1994 | Therrien et al. | |
| 5,334,918 A | 8/1994 | McMurtry et al. | |
| 5,339,249 A | 8/1994 | Schaeffer | |
| 5,369,592 A | 11/1994 | Honda | |
| 5,375,064 A | 12/1994 | Bollinger | |
| 5,378,091 A | 1/1995 | Nakamura | |
| 5,378,218 A | 1/1995 | Diamaru et al. | |
| 5,402,367 A | 3/1995 | Sullivan et al. | |
| 5,416,716 A * | 5/1995 | Zeman et al. | 700/187 |
| 5,453,933 A | 9/1995 | Wright et al. | |
| 5,471,395 A | 11/1995 | Brien | |
| 5,473,532 A | 12/1995 | Unno et al. | |
| 5,493,502 A | 2/1996 | Niwa | |
| 5,508,596 A | 4/1996 | Olsen | |
| 5,532,932 A | 7/1996 | Niwa | |
| 5,544,046 A | 8/1996 | Niwa | |
| 5,548,195 A | 8/1996 | Doran | |
| 5,604,677 A | 2/1997 | Brien | |
| 5,631,840 A * | 5/1997 | Ooka et al. | 700/182 |
| 5,668,459 A | 9/1997 | Kim | |
| 5,682,319 A | 10/1997 | Boland et al. | |
| 5,687,084 A | 11/1997 | Wertz | |
| 5,723,961 A | 3/1998 | Fugino et al. | |
| 5,751,589 A | 5/1998 | Sato et al. | |
| 5,798,928 A | 8/1998 | Niwa | |
| 5,815,400 A | 9/1998 | Hirai et al. | |
| 5,825,017 A | 10/1998 | Pryor | |
| 5,827,020 A | 10/1998 | Fujita et al. | |
| 5,828,574 A | 10/1998 | Robinson et al. | |
| 5,844,804 A | 12/1998 | Schussler | |
| 5,871,391 A | 2/1999 | Pryor | |
| 5,892,345 A | 4/1999 | Olsen | |
| 5,917,726 A | 6/1999 | Pryor | |
| 5,919,012 A | 7/1999 | Nakagawa et al. | |
| 5,926,389 A | 7/1999 | Trounson | |
| 5,932,132 A * | 8/1999 | Plemons | 219/769 |
| 5,946,449 A | 8/1999 | Dickerson et al. | |
| 5,991,528 A | 11/1999 | Taylor et al. | |
| 6,019,554 A | 2/2000 | Hong | |
| 6,052,628 A | 4/2000 | Hong | |
| 6,064,168 A | 5/2000 | Tao et al. | |
| 6,135,857 A | 10/2000 | Shaw et al. | |
| 6,163,735 A | 12/2000 | Yamada et al. | |
| 6,242,880 B1 * | 6/2001 | Hong | 318/571 |
| 6,310,621 B1 | 10/2001 | Gagne et al. | |
| 6,317,646 B1 | 11/2001 | de Caussin et al. | |
| 6,330,483 B1 | 12/2001 | Dailey | |
| 6,350,222 B2 | 2/2002 | Susnjara | |
| 6,368,879 B1 | 4/2002 | Toprac | |
| 6,400,998 B1 | 6/2002 | Yamazaki et al. | |
| 6,401,004 B1 | 6/2002 | Yamazaki et al. | |
| 6,401,006 B1 * | 6/2002 | Mizuno et al. | 700/189 |
| 6,438,445 B1 | 8/2002 | Yoshida et al. | |
| 6,456,897 B1 | 9/2002 | Papiernik et al. | |
| 6,470,225 B1 | 10/2002 | Yutkowitz | |
| 6,493,602 B1 | 12/2002 | Kranitzky et al. | |
| 6,521,856 B1 | 2/2003 | Marchesi et al. | |
| 6,535,788 B1 | 3/2003 | Yoshida et al. | |
| 6,587,747 B2 | 7/2003 | Hirai et al. | |
| 6,597,142 B2 | 7/2003 | Shibukawa et al. | |
| 6,643,563 B2 | 11/2003 | Hosek et al. | |
| 6,671,571 B1 | 12/2003 | Matsumiya et al. | |
| 6,675,061 B2 | 1/2004 | Hirai et al. | |
| 6,704,611 B2 | 3/2004 | Coleman et al. | |
| 6,766,216 B2 | 7/2004 | Erichsen et al. | |
| 6,772,038 B2 | 8/2004 | Kadono | |
| 6,774,598 B2 | 8/2004 | Kohler et al. | |
| 6,775,586 B2 | 8/2004 | Shibata et al. | |
| 6,782,306 B2 | 8/2004 | Yutkowitz | |
| 6,795,749 B2 | 9/2004 | Suh et al. | |
| 6,804,575 B2 | 10/2004 | Sagawa et al. | |
| 6,850,806 B2 | 2/2005 | Yutkowitz | |
| 6,865,499 B2 | 3/2005 | Yutkowitz | |
| 6,879,874 B2 | 4/2005 | Sinn | |
| 6,920,408 B2 | 7/2005 | Yutkowitz | |
| 6,922,606 B1 | 7/2005 | Yutkowitz | |
| 6,957,121 B2 | 10/2005 | Lottgen et al. | |
| 6,999,841 B1 | 2/2006 | Rutkowski | |
| 7,012,395 B2 | 3/2006 | Haunerdinger et al. | |
| 7,016,763 B2 | 3/2006 | Fauser et al. | |
| 7,050,883 B2 | 5/2006 | Cho et al. | |
| 7,096,087 B2 | 8/2006 | Sagawa et al. | |
| RE39,907 E | 11/2007 | Hong | |
| 7,450,127 B2 | 11/2008 | Hong et al. | |
| 2003/0065424 A1 | 4/2003 | Erichsen et al. | |
| 2005/0049743 A1 | 3/2005 | Fauser et al. | |
| 2005/0055323 A1 | 3/2005 | Zetek et al. | |
| 2005/0085940 A1 | 4/2005 | Griggs et al. | |
| 2005/0188309 A1 | 8/2005 | Tasker et al. | |
| 2005/0190185 A1 | 9/2005 | Fauser et al. | |
| 2005/0246052 A1 | 11/2005 | Coleman et al. | |
| 2005/0251030 A1 | 11/2005 | Azar | |
| 2005/0256604 A1 | 11/2005 | Diehi et al. | |
| 2006/0129280 A1 | 6/2006 | Thomas et al. | |
| 2006/0149410 A1 | 7/2006 | Erichsen et al. | |

FOREIGN PATENT DOCUMENTS

| | | |
|---|---|---|
| JP | 62130130 | 6/1987 |

WO    WO9222023    12/1992

OTHER PUBLICATIONS

John Kieffer, Aidan J. Cahill, and Matthew R. James, "Robust and Accurate Time-Optimal Path-Tracking Control for Robot Manipulators," IEE Transactions on Robotics and Automation, vol. 13, No. 6, Dec. 1997.

L.M. Galantucci, L. Tricarico, and A Dersha, "Automatic Clamping Selection in Process Planning using Tolerance Verification Algorithms," Advanced Manufacturing Systems and Technology, Springer Verlag, Wein, New York, 1996.

Ales Hace, et al., "Rubust Motion Control and Trajectory Planning for Planar Laser Cutting System," IEEE Advanced Motion Control Proceedings Coimbra, 1998.

Hong C. Zhang and J. Mei, "Automated Tolerance Anaysis for CAPP System," International Journal of Advance Manufacturing Technology, 10:219-224, 1995.

Parimal Kopardekar and Sam Anand, "Tolerance Allocation Using Neural Networks," Internatioanl Journal of Advance Manufacturing Technology, 10:269-276, 1995.

M.M. Sfantiskopoulos, et al., "Concurrent Dimensioning for Accuracy and Cost," International Journal of Advance Manufacturing Technology, 10:263-268m 1995.

O. H. Chai, et al., "An Interpolation Scheme for Tool-Radius Compensated Parabolic Paths for CNC," IIE Transactions, 28:11-17, 1996.

Y. D. Chen, J. Ni, and S.M. Wu, "Real-Time CNC Tool Path Generation for Machining IGES Surfacs," Transactions of the ASME, vol. 115, Nov. 1993.

G. S. Li, et al., "In-Process Drilling States Monitoring in Machine Centre by Time Series Analysis," International Conference on Manufacturing Autmation, vol. 1712, 1992.

Bullock, T., "Motion Control and Industrial Controllers," Motion Control, Sep./Oct. 1990.

"Automated Manufacturing Inspection System," NTIS Tech Notes, U.S. Department of Commerce, Springfield, VA, Feb. 1, 1991, p. 179, 1&2.

Imamura, Fumihiko and Kaufman, Howard, "Time Optimal Contour Tracking for Machine Tool Controllers," IEEE Control Systems, Apr. 1991.

Berthiaume, D., "Justification for AC vs. DC Drive Systems," Pulp and Paper Industry Technical Conference, Conference Record of 1991 Annual Volume, Jun. 3-7, 1991, pp. 234-238.

Chuang, Hua-Yi and Liu, Chang-Huan, "A Model-Referenced Adaptive Control Strategy for Improving Contour Accuracy of Multiaxis Machine Tools," IEEE Transactions on Industry Applications, vol. 28., No. 1., Jan./Feb. 1992.

Bullock, T., "Linear and Circular Interpolation," Motion Control, Apr. 1992.

Wilson, C., "How Close Do You Have to Specify Points In a Contouring Application?", Motion Control, May 1993.

Goto, Satoru and Nakamura, Masatoshi, "Accurate Contour Control of Mechatronic Servo Systems Using Gaussian Networks," IEEE Transactions on Industrial Electronics, vol. 43., No. 4, Aug. 1996.

Yeh, Zong-Mu, "Cross-Coupled Fuzzy Logic Control for Biaxial Servomechanisms," IEEE 1996.

Lee, Je-Hie, Huh, Uk-Youl and Park, Ho-Joon, "Improved Contouring Control for Multi-Axis System with Two-Degrees-of-Freedom Structure," International Symposium on Industrial Electronics (ISIE), Guimaraes, Portugal, pp. 901-905, 1997.

Yeh, Syh-Shiuh and Hsu, Pau-Lo, "Theory and Applications of the Robust Cross-Coupled Control Design," Proceedings of the American Control Conference, Albuquerque, New Mexico, Jun. 1997.

Li, Perry Y., "Coordinated Contour Following Control for Machining Operations—A Survey," Proceedings of the American Control Conference, San Diego, California, Jun. 1999.

Lee, Hyun C. and Jeon, Gi J, "Real-time Compensation of Two-dimensional Contour Error in CNC Machine Tools," Proceedings of the 1999 IEEE/ASME International Conference on Advanced Intelligent Mechatronics, Sep. 19-23, 1999, Atlanta, USA.

Lacerda, Helder Barbieri and Belo, Eduardo Morgado, "A Modified Contour Error Controller for a High Speed XY Table," Journal of the Brazilian Society of Mechanical Sciences, vol. 22., No. 3, pp. 443-455, 2000.

Yeh, Syh-Shiuh and Hsu, Pau-Lo, "A New Approach to Biaxial Cross-coupled Control," Proceedings of the 2000 IEEE, International Conference on Control Applications, Anchorage, Alaska USA, Sep. 25-27, 2000.

Chiu, George T.-C., and Tomizuka, Masayoshi, "Contouring Control of Machine Tool Feed Drive Systems: A Task Coordinate Frame Approach," IEEE Transactions on Control Systems Technology, vol. 9, No. 1., Jan. 2001.

Yeh, Syh-Shiuh and Hsu, Pau-Lo, "Estimation of the Contouring Error Vector for the Cross-Coupled Control Design," IEEE/ASME Transactions on Mechatronics, vol. 7., No. 1., Mar. 2002.

Chen, Shyh-Leh, Liu, Hung-Liang and Ting, Sing Ching, "Contouring Control of Biaxial Systems Based on Polar Coordinates," IEEE/ASME Transactions on Mechatronics, vol. 7., No. 3., Sep. 2002.

Hsieh, Chen-Chou, Wang, An-Ping and Hsu, Pau-Lo, "CAN-Based Motion Control Design," SICE Annual Conference in Fukui, Aug. 4-6, 2003, Fukui University, Japan.

Wang, Lisong and Zhang, Jing, "The Research of Static De-coupled Contour Control Technique of the Ultra-precision Machine Tool," Proceedings of the 5th World Congress on the Intelligent Control and Automation, Jun. 15-19, 2004 Hangzhou, China.

Xiao, Yong, Zhu, Kuanyi and Liaw, Hwee Choo, "Generalized Synchronization Control of Multi-axis Motion Systems," www.sciencedirect.com, Control Engineering Practice, vol. 13, pp. 809-819, 2005.

Advanced Velocity Control (AVC) and Adaptive Finishing Surface (AFS) Options Manual, 2002, 15 pages.

Adlink Technology Inc., PCI-8164/MPC-8164 Advanced 4-Axis Servo/Stepper Motion Control Card User's Guide, Rev. 1.30, Jun. 2003, 188 pgs.

* cited by examiner

METHOD OF CURVATURE CONTROLLED DATA SMOOTHING

CROSS REFERENCE TO RELATED APPLICATIONS

This application claims the benefit under Title 35, U.S.C. §119(e) of U.S. Provisional Patent Application Ser. No. 60/664,398, entitled METHOD OF TRAJECTORY MOTION CONTROL, filed on Mar. 23, 2005.

BACKGROUND OF THE INVENTION

1. Field of the Invention

The present invention relates to navigation of a path by a moving object, and, more particularly, to motion control systems for computer-controllable machine tools.

2. Description of the Related Art

Automation has resulted in the development of motion controllers capable of signaling actuator devices to effect motion in linkages along a desired trajectory while performing useful work. Motion controllers permit increased speed and precision in performing a given task over manual operation. Robots and automated manufacturing equipment are examples of a few of the products that utilize motion control technology. Programming these devices is often accomplished by specifying the desired trajectory as a collection of line/arc segments, along with the desired velocity of a tool along each segment. The velocity of the tool is often kept constant along each segment or group of segments of complex trajectories because velocity optimization along each point in the trajectory would be very time consuming.

Most humans who program tool trajectory have a fundamental understanding of the trade-off between velocity and accuracy. It is well known that at higher velocities it becomes more difficult for the control system to stay on the desired trajectory. Thus, trajectory programmers must make a trade-off between the velocity and the precision of motion along the desired trajectory. These decisions are often based on the programmer's experience and result in an iterative programming process wherein the trajectory is executed and then modified to reduce the velocity in sections where an undesirable deviation from the desired trajectory is observed. Thus, programmers control the deviation from the desired trajectory, and therefore the quality of the motion, by manipulating the tool velocity along the trajectory.

Motion control systems for manufacturing equipment, often referred to as Computer Numerical Controllers (CNCs), attempt to maximize the velocity of motion control while minimizing the deviation from the desired trajectory. CNCs may be used to control manufacturing equipment such as lathes, grinders and mills. CNCs are computing devices adapted for the real-time control of machine tools. A numerical controller receives a set of coded instructions that form a part program. Part programs are typically expressed in a standard G&M code language, or a close derivative of this language based on either the International Standards Organization (ISO) or the Electronics Industries Association (EIA) RS-274-D, using codes identified by letters such as G, M, or F. The codes define a sequence of machining operations to control motion in the manufacture of a part. The numerical controller converts the codes to a series of electrical signals which control motors attached to a machine tool effecting the motion of the tool along the programmed trajectory.

A motion controller operating a milling machine is one example of CNC. Lathes, grinders and coordinate measuring machines (CMMs) are other examples of manufacturing equipment which utilize a CNC for motion control. A three-axis CNC milling machine has a head where a tool is mounted, and a table movable relative to the tool in the X, Y plane. Motors control motion of the table in the X and Y directions and motion of tool in the Z direction, establishing an orthogonal X, Y, Z Cartesian coordinate system. Positional sensors (encoders or scales, typically) provide feedback indicating the position of the tool with respect to the coordinate system of the milling machine. The CNC reads in a part program specifying a tool path trajectory that the tool is to follow at a specified velocity or feedrate. The controller continuously compares the current tool position with the specified tool path. Using this feedback, the controller generates signals to control motors in such a way that the tool's actual trajectory matches the desired tool path or trajectory as closely as possible while the tool moves along the tool path at the desired velocity. The controller may be used in conjunction with a computer aided machining (CAM) system.

The deviation of the actual tool trajectory from the desired trajectory or tool path is referred to as "machining error." The machining error may be computed as the distance between the instantaneous tool position and the desired trajectory as specified by the tool path. CNC tolerance is defined as the amount of the permitted machining error while machining. Motion controllers are expected to maintain good or tight CNC tolerance. The machining error depends on many factors including the performance of the motion controller and the feedrate selected for traversing the trajectory during machining. In general, higher feedrates will result in larger machining errors.

Known part programs do not explicitly address CNC tolerance issues. The machine tool operator, part programmer or machinist must set feedrates to attempt to address these issues. In fact, tolerance cannot be expressed using known CNC programming languages, such as EIA RS-274-D, nor do existing motion controllers support the notion of constraining motion so that a CNC tolerance specification is met.

A tolerance based motion control system, including a method for setting feedrates based upon tolerance, is disclosed in U.S. Pat. No. 6,242,880, which is incorporated herein by reference. While this patent represents a significant step forward in the art of motion control, refinements are needed in order to improve feedrates while still operating within the tolerance limits.

SUMMARY OF THE INVENTION

The present invention applies smoothing to any trajectory of a motive body. For example, the present invention may be applied to smooth the trajectory of any motive body, such as a vehicle or projectile, regardless of whether the vehicle or projectile travels by land, sea or air. In a specific implementation, the present invention may also be applied to adjust the feedrate of a CNC machine tool based on the CNC tolerance specified by the programmer and the programmed tool path, defining the maximum allowable feedrate at each point along the programmed trajectory. This information, along with position feedback, is used to modify the feedrate along the actual trajectory of motion to limit the position deviation from the ideal programmed path so that the requested CNC tolerance can be achieved.

Tolerance Based Control (TBC) Technology introduces the notion of CNC tolerance to the programming and machining environment. It effectively allows the CNC programmer to program a part by using the maximum, or near maximum, permissible feedrates for a given cutting condition, i.e. cutter, speed, depth of cut, material conditions and so forth, and specify a desired CNC Tolerance.

The data smoothing technology in TBC control may include examining a target trajectory, for example a programmed NC tool trajectory identifying NC line segments which can be smoothed, and converting these NC line data into arcs while maintaining a given tolerance. Data smoothing may include converting point-to-point linear moves into a sequence of mutually tangential arcs within allowed tolerances and with relatively small curvature changes. The extent of smoothing may be dependent on the specified tolerance. This technology has the benefit of achieving smoother trajectory, smoother velocity, acceleration, better feedrate control and improved surface finish.

An advantage of the present invention is that it provides improved trajectories or tool paths for the machine tool. More particularly, the tool paths are smoother, thereby permitting higher feedrates and providing smoother surfaces on the work piece.

The lookahead technology in TBC replaces non-TBC fixed buffer lookahead algorithms, reducing the possibility of data starvation, overshooting, tolerance breaching, dwell marks and poor surface finish on part products. Lookahead may ensure enough distance to accelerate or decelerate from one speed to another. When the length of a motion segment is relatively short and not enough for a large speed change, the lookahead algorithm may calculate and limit the speed of that motion segment according to some motion profile, such as an S-curve speed profile. Because lookahead is usually performed in real time and includes recursive modification of previously processed motion commands, the high efficiency of the algorithm may result in reduction of the CPU load and an improvement in machine performance. The recursive modification of motions may involve only logic and addition. Moreover, the algorithm may have the advantage of requiring fewer iterations of modifying previous commands. The algorithm may have a further advantage of improved run times which increases the system speed or throughput.

One option in a non-TBC Lookahead algorithm is to calculate a speed limit upon each instance of the motion distance being found insufficient to achieve a desired speed change. Such calculation of the speed limit may involve a large amount of computation. Repeatedly performing the calculation may be undesirable because of the processing time and resources required. The additive lookahead algorithm of the present invention may use a stop distance concept as a metric of speed limitation, which may be very computationally efficient.

Unlike the classical Proportional, Integral and Derivative (PID) approach, the TBC approach may use predictive control techniques, which replaces non-TBC point-to-point fixed cycle control with trajectory and velocity based motion control. TBC may include looking at where the cutter tool is in relation to the programmed trajectory and adjusting accordingly. TBC continually processes machine tool position feedback along with the programmed trajectory and knowledge of a machine's capabilities to instantaneously issue a control signal that is responsive to the instantaneous machining conditions.

In the "true arc" technology employed by the present invention, tool motion is controlled along a trajectory that is modeled as an arced path without polygon approximation. That is, the tool may be commanded to follow an arced trajectory rather than a trajectory formed by a series of linear segments that approximate a curved trajectory. By use of arced trajectories and associated vectors in real time instead of segment-based trajectories, TBC control may eliminate the conversion of arc trajectories into a straight-line approximation of the arc, allowing for the direct precision machining of arc segments, the elimination of the chord error, the reduction of part program size and the elimination of the processing required to convert complex trajectories into their polynomial approximations.

The TBC motion kernel of the present invention may take the motion commands from the lookahead queue and control the servo system to track the contour trajectory. The TBC motion control is different from non-TBC motion control in that it is a closed-loop contour tracking control.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 12b is a diagram indicating how distances are related to the plot of FIG. 12a.

Figure 1:
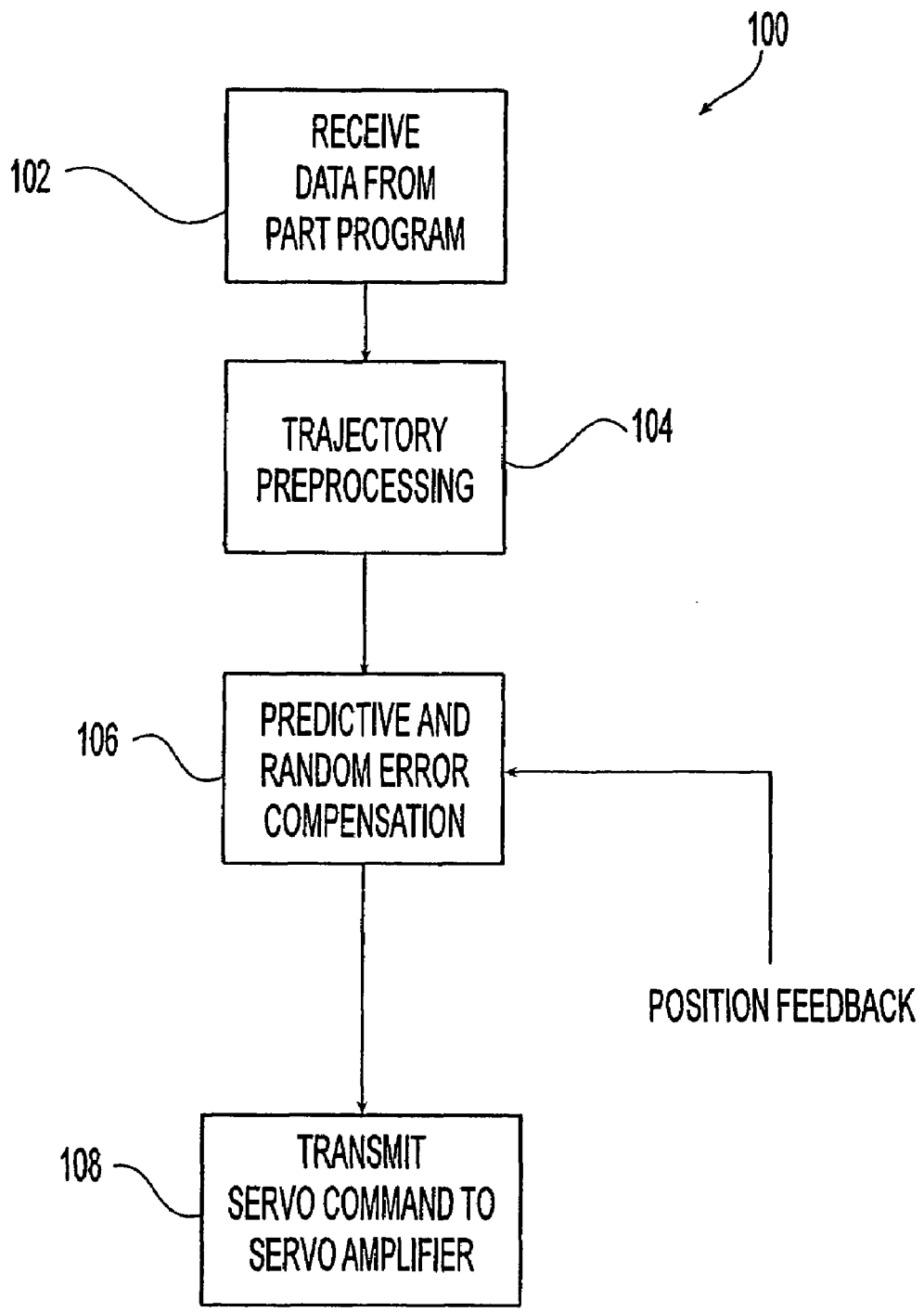
FIG. 1 is a flow chart of one embodiment of a tolerance based control method of the present invention.

Corresponding reference characters indicate corresponding parts throughout the several views. Although the drawings represent embodiments of the present invention, the drawings are not necessarily to scale and certain features may be exaggerated in order to better illustrate and explain the present invention. The exemplification set out herein illustrates an embodiment of the invention, in one form, and such exemplifications are not to be construed as limiting the scope of the invention in any manner.

DESCRIPTION OF THE PRESENT INVENTION

Referring now to the drawings and particularly to FIG. 1, there is shown one embodiment of a tolerance based control method 100 of the present invention, including the performance of the major functions of a tolerance based controller of the present invention as it machines the part defined by the part program. While the controller of this disclosed embodiment relates to a particular case of the present invention, dealing with CNC machine controls, the invention may be generally applied to bodies having various motion control situations as one of skill in the art would recognize, such as robotic control, vehicular control, projectile control, and the like.

In a first step 102, the controller receives part data from the part program. The part program may include data specifying the dimensions, shape, and other physical characteristics of the part or "work piece" to be machined. In general, a trajectory preprocessing step 104 includes calculating a desired tool path and feedrates that the machine tool should follow in order to produce the part within a relatively short period of time and within dimensional tolerance constraints. As the part is machined, position feedback specifying the actual position of the machine tool is used in a predictive and random error compensation step 106 to modify servo commands to redirect the machine tool to compensate for, i.e., correct, both predictive or repeatable errors and random or non-repeatable errors in the actual machine tool path as compared to the commanded tool path. In a final step 108, the modified servo command is transmitted to the servo amplifier for use in actuating the machine tool.

Figure 2:
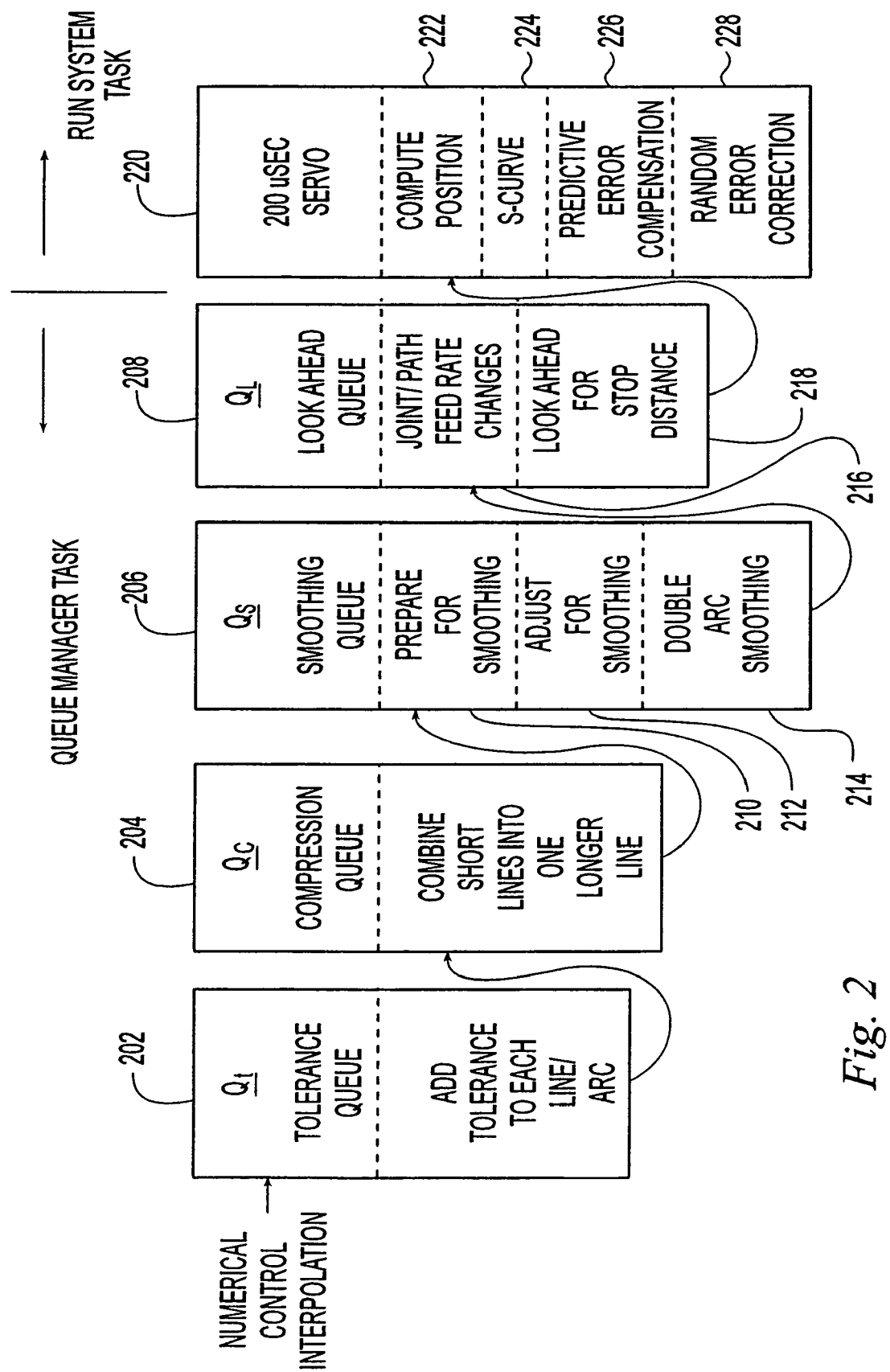
FIG. 2 is a block diagram of one embodiment of a tolerance based control system of the present invention.

The method of FIG. 1 is now described in more detail with reference to the flow diagram of FIG. 2. In general, steps 102 and 104 correspond to the Queue Manager Task of FIG. 2, and steps 106 and 108 correspond to the Run System Task of FIG. 2. The part program may provide the locations of discrete points on the surface of the part, and the Numerical Control may interpolate between these discrete points to thereby define a desired trajectory or tool path formed of contiguous lines and arcs. As used herein, the term "arc" may indicate a segment of a circle. That is, the arc may have a constant radius.

The Queue Manager Task preprocesses the part program motion data with four consecutive operations that transform it into high quality motion data before the Run System Task executes it. The four operations are tolerance understanding within Tolerance Queue 202, data compression within Compression Queue 204, data smoothing within Smoothing Queue 206, and additive lookahead within Lookahead Queue 208. The Queue Manager may perform the corresponding data processing on each queue and move the data flow through the consecutive queues in a pipeline manner.

The Queue Manager may preprocess NC motion commands such as positioning (G00), line (G01), arc (G02, G03), and an NC tolerance command E used for the tolerance based control. Use of the TBC technology is consistent with existing or legacy CNC part programs. This technology allows the operator to specify NC tolerance commands along with the existing NC commands for execution. By inserting a new NC tolerance command within an existing G&M code part program, the CNC programmer can specify different CNC tolerance constraints.

The NC tolerance commands specify a region and a tolerance value to be applied to that region along with a command identification number. An NC tolerance command is defined as an E code:

E tol Xx1 Yy1 Zz1 Xx2 Yy2 Zz2 Iid

An E code requests that a three-dimensional rectangular region defined by the coordinates of the diagonal corners (x1, y1, z1) and (x2, y2, z2), x1<x2, y1<y2, z1<z2, hold a non-zero NC tolerance value of tol. This specific tolerance command may be identified by an integer value id.

It is possible for multiple E codes to define overlapping tolerance regions.

Figure 3A:
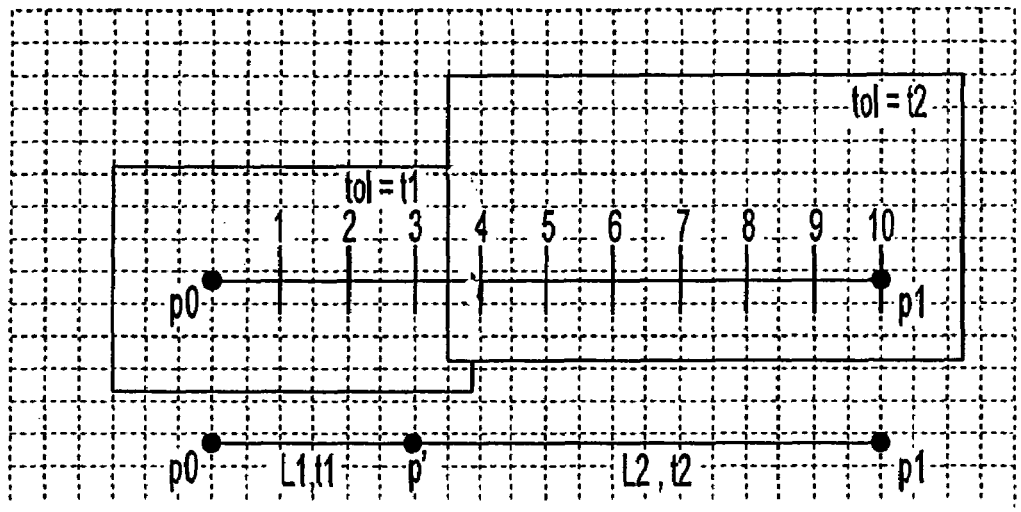
FIGS. 3a-c are diagrams illustrating the mapping of different tolerance values to different regions of machining space.
Figure 3B:
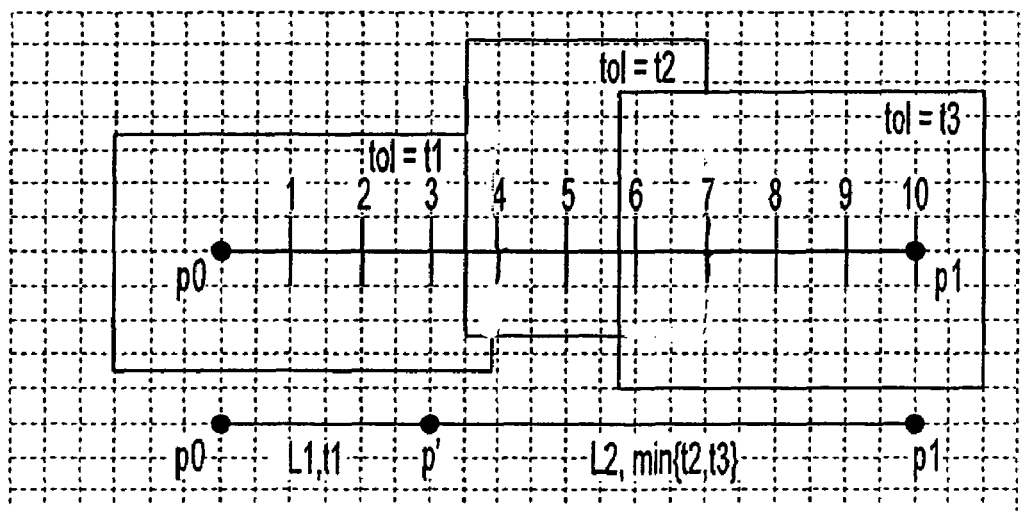
Figure 3C:
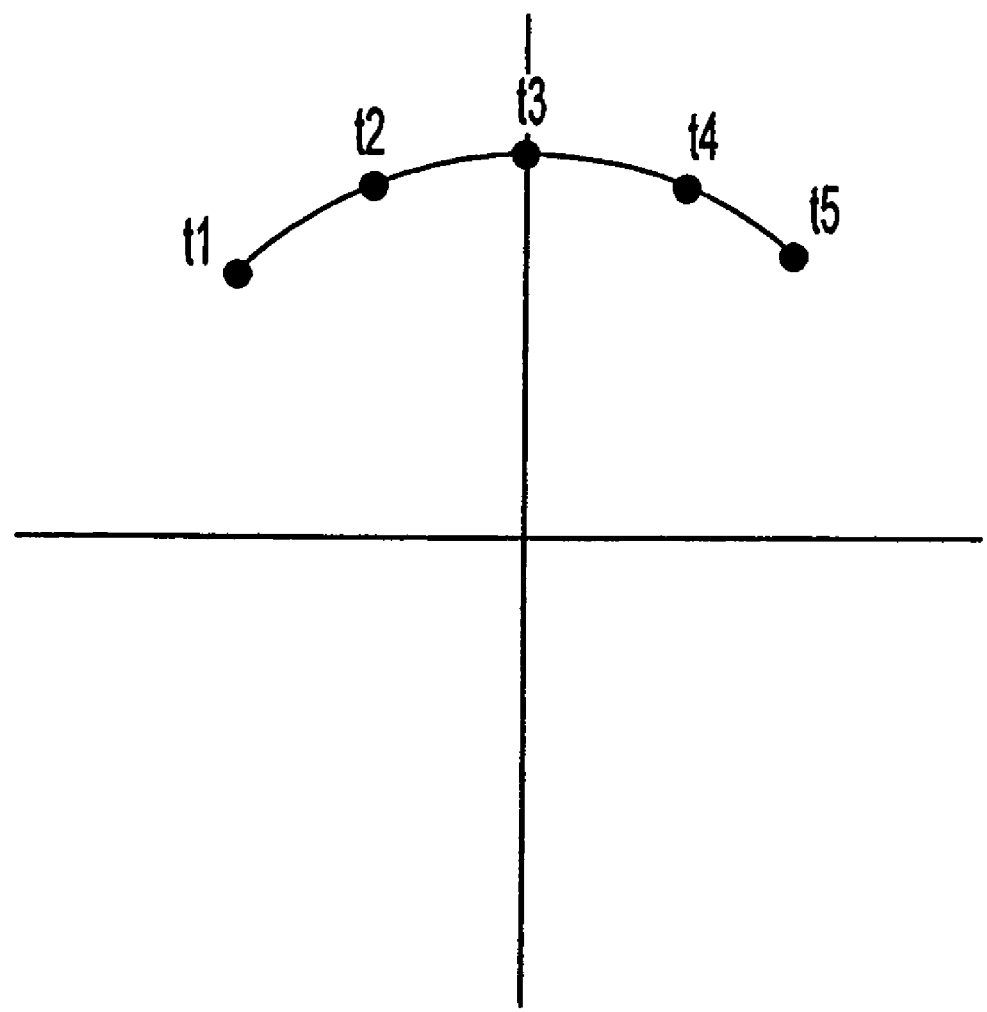

One embodiment of tolerance regions having different values and overlapping one another is illustrated in FIGS. 3a-c, FIG. 3a illustrating a first case, and FIG. 3b illustrating a second case. For purposes of computational efficiency, a line move may be divided into at most two lines. Only one more point, point p', is generated between points p0 and p1.

In the case of an arc (FIG. 3c), three equidistant points t2, t3, t4, are added between an arc starting point t1 and an end point t5. The lowest of the tolerances of the five points defines the tolerance of the arc, as indicated by the equation: tol=min {t1, t2, t3, t4, t5}.

After the tolerance understanding operation, the elements to be taken from Tolerance Queue 202 and sent to Compression Queue 204 are: positioning commands, line commands with required tolerance attached, arc commands with required tolerance attached, and the program end command.

Figure 4A:
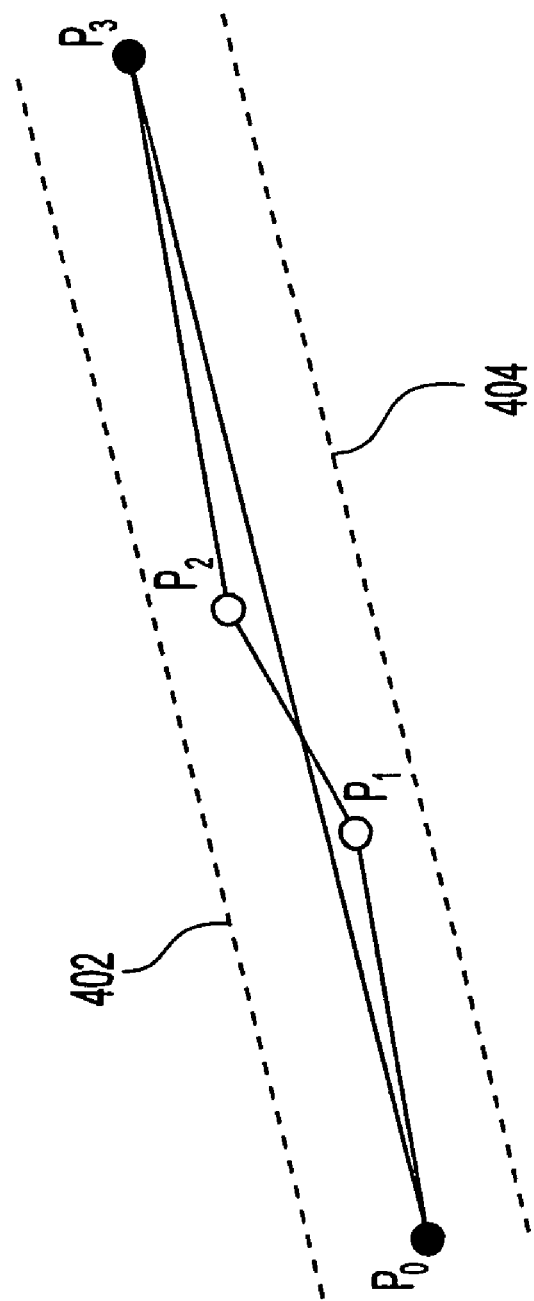
FIG. 4a is a plot of program data points, illustrating a method of data compression according to one embodiment of the present invention.

In a data compression operation within Compression Queue 204, the program data is compressed. In many part programs, there are short line moves that result in a poor surface finish on the part. It is possible to combine some of these short lines into longer lines, which may improve the part quality. The data compression operation may determine whether short lines can be combined into longer lines, and the data compression operation may perform such data compression if it is possible to do so. In a data compression operation illustrated in FIG. 4a, points $P_i$ and $P_2$ are eliminated and a new line is formed from point $P_0$ to point $P_3$. Tolerance boundaries or constraints on the tool path are indicated by dashed lines 402, 404. Tolerance boundaries 402, 404 may be smaller by an order of magnitude than user-defined numerical control tolerances by E code.

A line command is a point-to-point move. Combining short line moves into a longer one may include determining a starting point and an end point among the target point sequence for a new line move and removing all the intermediate points. The new, longer line move can replace the old short line moves only if some conditions are met, including the tolerance condition, i.e., the distance from each of the removed points to the new line is within a given tolerance.

Figure 4B:
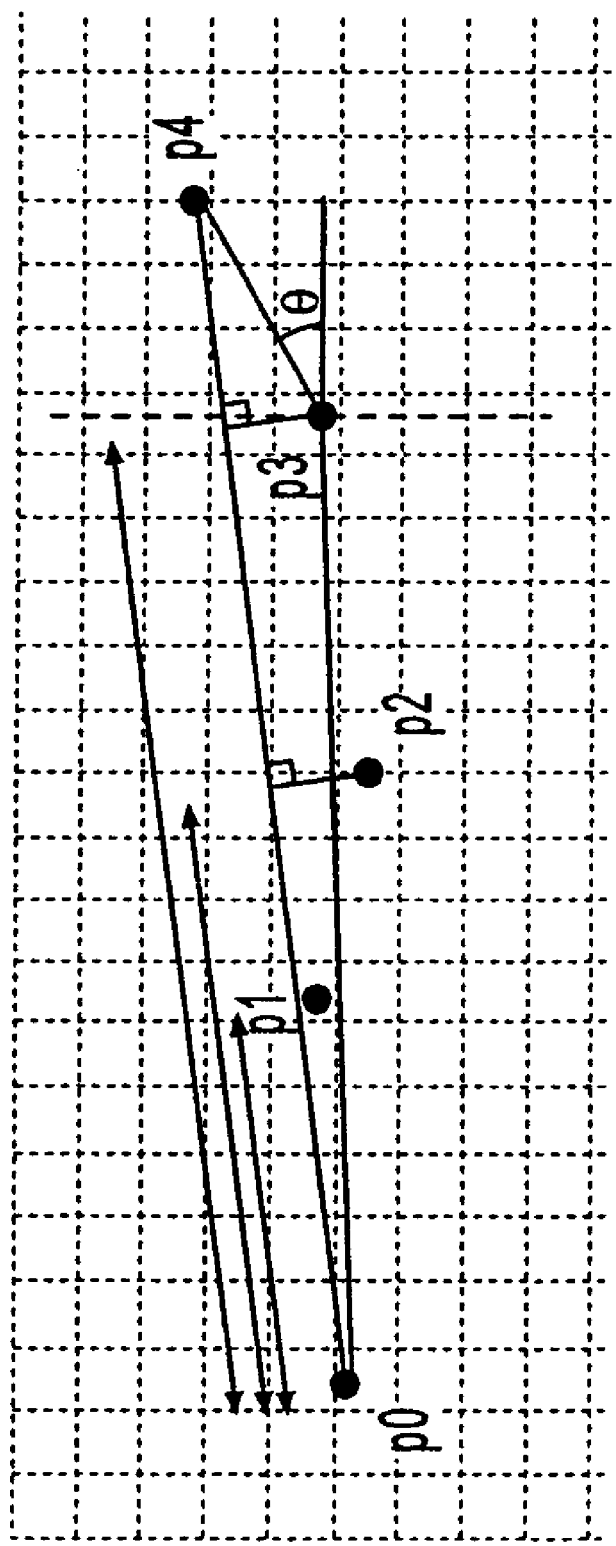
FIG. 4b is a plot of program data points, illustrating a method of data compression according to another embodiment of the present invention.

To do data compression, all line commands may be sequentially examined in Compression Queue 204. Four tests or criteria are used to determine whether a next point should be added to the compression queue, or whether compression should be performed on only the points that are presently in the compression queue. In the illustration of FIG. 4b, assume that points p0, p1, p2 and p3 have already been found to meet the compression criteria, and that it is being determined whether point p4 should be added to the compression queue, or whether compression should be performed on only points p0, p1, p2 and p3. The four compression criteria may be as follows:

Test 1: |p4−p0|<0.05 inch.

Test 2: For p3, the angle $\theta$ is between −90 degrees and 90 degrees.

Test 3: p0.tol=p1.tol=p2.tol=p3.tol=p4.tol. That is, an equal tolerance has been assigned to each point from the tolerance table.

Test 4: The perpendicular distances from p1, p2 and p3 to the line p0p4 are less than the specified tolerance.

If the above four tests are satisfied, then p4 is added to the compression queue. If the above four tests are not satisfied, then p3 is added to the smoothing queue and p1 and p2 are discarded in compression. Essentially, three segments (p0p1, p1p2 and p2p3) are combined into one segment (p0p3).

I. Data Smoothing

Data smoothing operations convert NC line data into arcs while maintaining a given tolerance. The data smoothing may advantageously result in smoother velocity and acceleration, better control of feedrates, improved surface finish, and full utilization of the TBC technology.

Figure 5A:
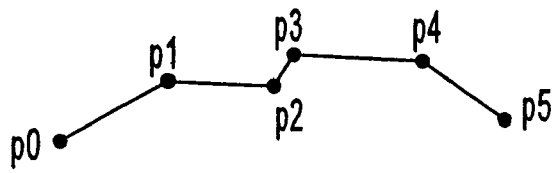
FIG. 5a is a graphical representation of Level 0 data smoothing.
Figure 5B:
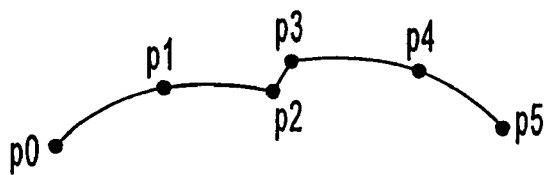
FIG. 5b is a graphical representation of Level 1 data smoothing.
Figure 5C:
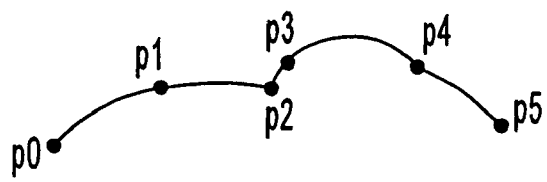
FIG. 5c is a graphical representation of Level 2 data smoothing.
Figure 5D:
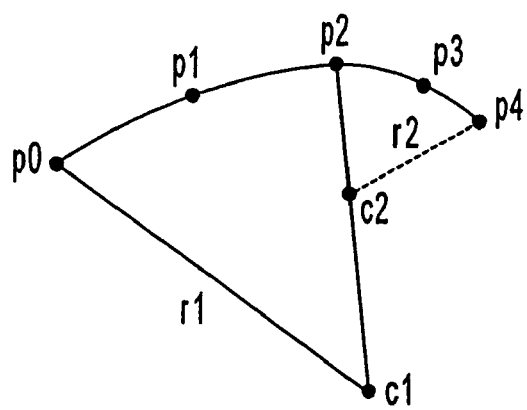
FIG. 5d is a graphical representation of Level 3 data smoothing.

FIGS. 5a-e illustrate level 0, level 1, level 2, level 3, and level 4 smoothing, respectively: level 0, including no smoothing and producing a cut polygon; level 1, in which arcs replace lines, and arcs may not be connected to each other in most cases; level 2, in which arcs replace lines, arcs are connected to each other, and arcs are not tangential to each other in most cases; level 3, in which arcs replace lines, arcs are connected to each other, and arcs are tangential to each other; and level 4 (a smoothing level that may be provided by the present invention), in which arcs replace lines, arcs are connected to each other, arcs are tangential to each other, and arc curvatures change gradually. In level 0-3 smoothing, the output of smoothing, the final trajectory, always passes through the data points. In FIG. 5d, c1 and r1 are the center and radius of the arc defined by the points p0, p1 and p2; and c2 and r2 are the center and radius of the arc defined by the points p2, p3 and p4. The curvature of an arc is defined as the inverse of the radius (1/r). Thus, in the level 3 example of FIG. 5d, the relatively large radius change from r1 to r2 results in a correspondingly large curvature change between the two arcs.

Level 4 is different from the other smoothing levels in the sense that the data points are adjusted (within the specified tolerance) to achieve gradual curvature changes. This adjustment of the data points is acceptable in applications such as the multi-axis contouring (or metal cutting using CNC machines) because the adjustments are very small (typically less than 0.0005 inch) and are within a specified tolerance.

The points may be adjusted to achieve gradual curvature changes. Gradual change of curvature along the trajectory may facilitate motion control.

Motion of a tool along an arc requires a force, referred to as "centripetal force", directed toward the center of the arc. In the case of CNC machines, this force may be provided by the motors. Sudden and relatively large changes in the centripetal forces (as the motion moves from one arc to the next) may result in larger overshoots, which may be detrimental to the resulting surface finish.

Figure 5E:
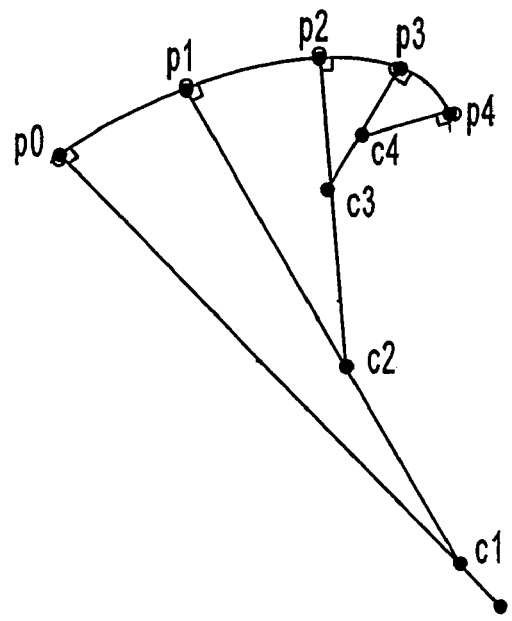
FIG. 5e is a graphical representation of Level 4 data smoothing.

FIG. 5e illustrates minor adjustments to the positions of points p0 to p4 as compared to their earlier positions as shown in FIG. 5d. The minor adjustments may result in the points defining a trajectory such that the curvature changes gradually. However, how large an adjustment that is allowed within the scope of the invention may depend upon the tolerance.

In one embodiment of the present invention, a solution is employed such that the trajectory includes only circular arcs. Defining the trajectory as a series of circular arcs may have the advantage of reducing the computational/mathematical complexity of calculating the point adjustments. Thus, the points are instead adjusted such that the trajectory is defined by a series of circular arcs in one embodiment of the present invention.

In one embodiment, the motion control is implemented in a 200 usec loop, i.e., the motion control is updated every 200 usec. Thus, there is a need for computations to be performed efficiently such that the computations may be performed every 200 usec. Due to limitations in the speed of a processor which may perform several other operations in addition to motion control, using a trajectory defined by a series of circular arcs may be helpful.

Data smoothing may include three phases or operations, namely preparing for smoothing, adjusting for smoothing, and smoothing using a double arc algorithm. In a first operation of a smoothing method of the present invention, line data is identified for smoothing. It is not always feasible to convert NC line data into arcs while maintaining a given tolerance, as with, for example, connected lines with sharp angles. It is sometimes not desirable to smooth NC line data, for example, long line moves. Certain conditions may need to be satisfied before raw line data can be smoothed. The first operation examines the original line data identifying the line segments, which meet the conditions for smoothing.

A. Prepare for Smoothing

During the first operation, all line move target points are sequentially examined in the smoothing queue. The line segments, which can be smoothed, are determined and the target points of all these lines may be tagged as "smoothing" or "no smoothing".

Figure 6:
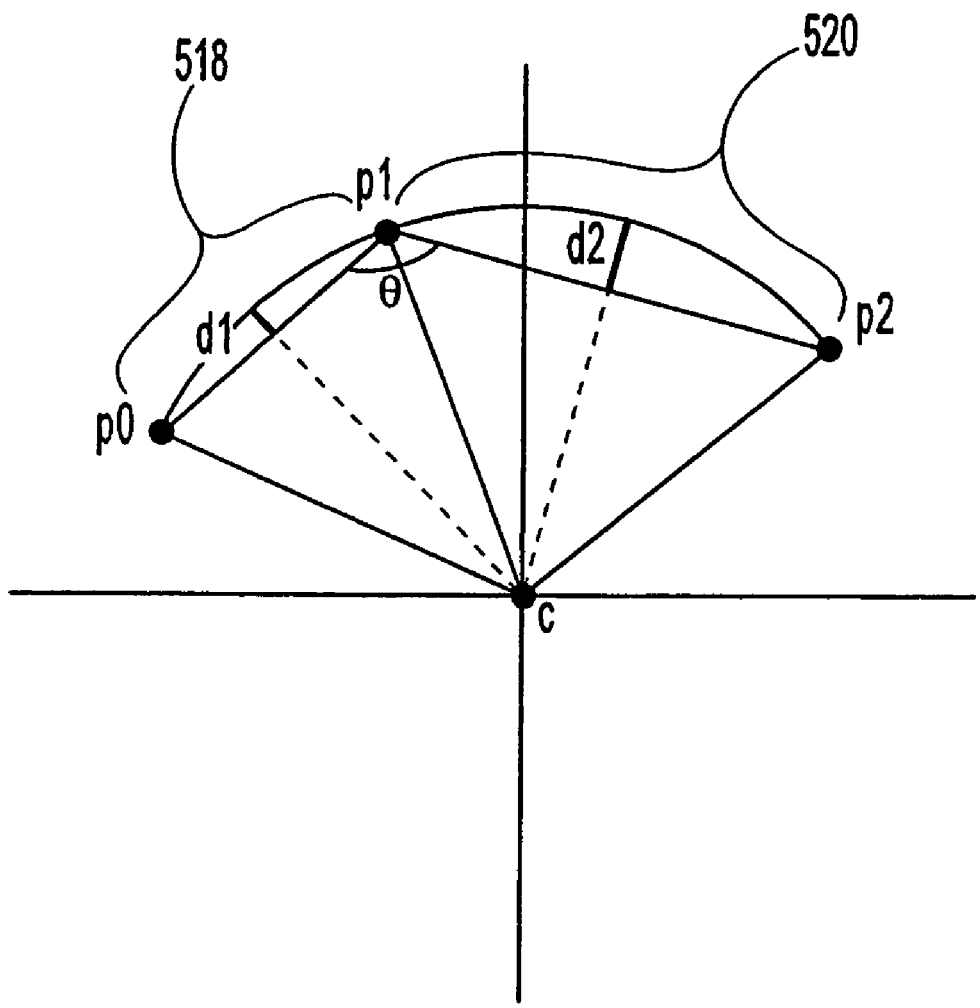
FIG. 6 is a plot of program data points, illustrating a method of selecting data points for data smoothing according to an embodiment of the present invention.

In FIG. 6, three points p0, p1, p2 are joined by an arc. In one embodiment, distance d1 is the shortest distance between a midpoint of line segment p0p1 and the arc p0p1p2; and a distance d2 is the shortest distance between the midpoint of line segment p1p2 and the arc p0p1p2. A middle one of the three points, i.e., point p1, may be marked for smoothing if the following three conditions or criteria are satisfied:

Test 1: Both p0p1 and p1p2 are lines.

Test 2: Max{d1,d2}<0.0005 inch. That is, both d1 and d2 are less than some predetermined distance, such as 0.0005 inch.

Test 3: The angle θ>145 degrees, or some other predetermined angle. If the above three conditions are not met, then point p1 may not be marked for smoothing.

B. Adjust for Smoothing

In a second operation, line data is adjusted for smoothing. The second operation may reduce the curvature changes on a three-dimensional curve represented by a sequence of three-dimensional points. The local curvature at a given point on such a curve is mainly determined by neighboring points. A minor change of the position of the given point or of its neighboring points may significantly change the local curvature. Thus, it is possible to modify the positions of points within the given tolerance such that the curvature changes on the three-dimensional curve represented by the modified points will be reduced. The smaller the curvature changes on the curve, the smoother the curve may be.

Figure 7:
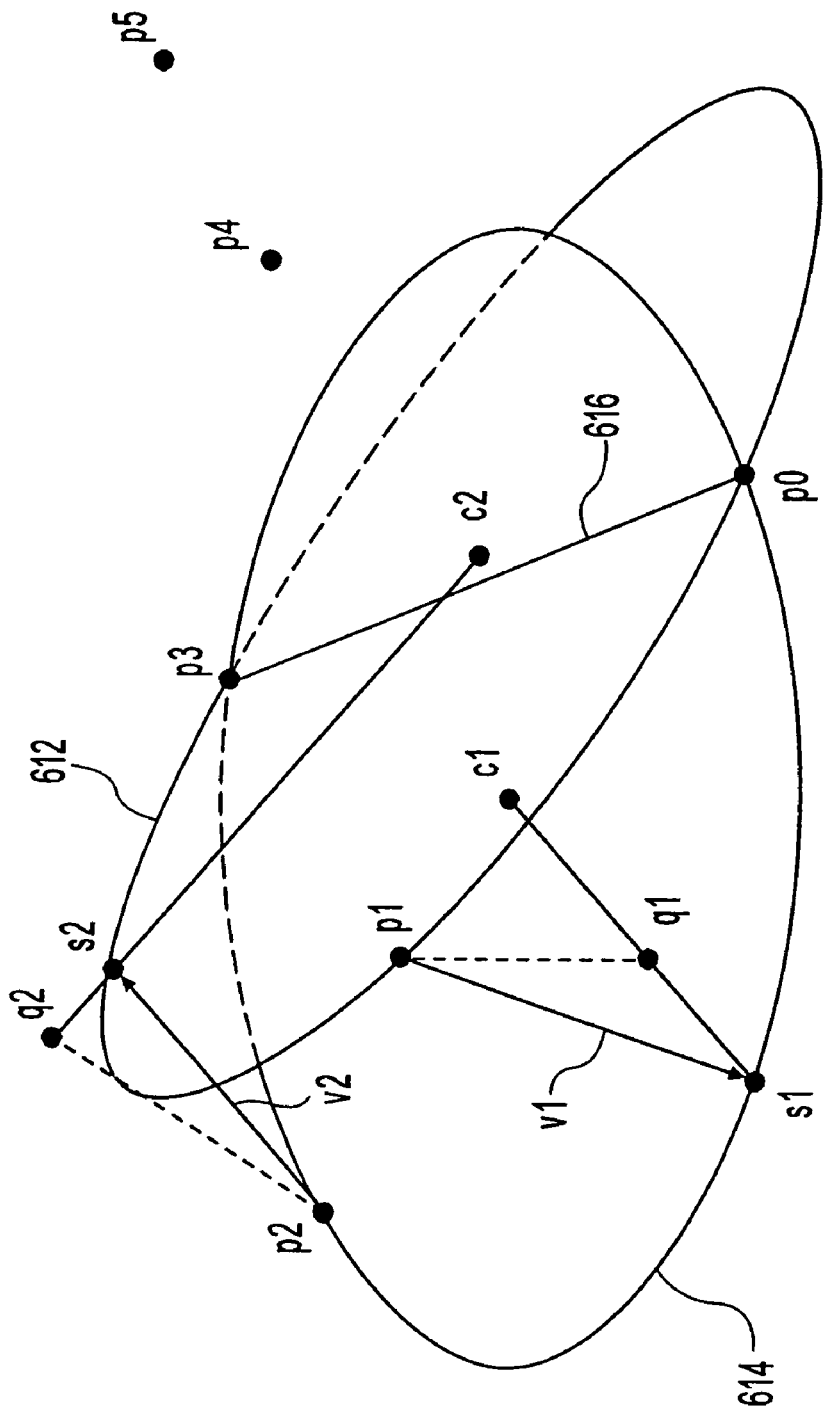
FIG. 7 is a perspective view of a plot of program data points, illustrating a method of adjusting line moves for smoothing according to an embodiment of the present invention.

FIG. 7 illustrates an embodiment of the present invention for adjusting line moves for smoothing. The line moves may be adjusted relative to each other to control the path curvature and to prepare for arc fitting. Two construction arcs 612, 614, which are not coplanar, are located that pass through points $P_0P_1P_3$ and $P_0P_2P_3$, respectively. A line of intersection of the planes of arcs 612, 614 is designated 616. The center of a circle defined by arc 612 is designated c2; and the center of a circle defined by arc 614 is designated c1. A projection of point p1 on the plane of arc 614 is designated point q1. That is, a line that extends through both of points p1 and q1 is perpendicular to the plane of arc 614. Similarly, a projection of point p2 on the plane of arc 612 is designated point q2. That is, a line that extends through both of points p2 and q2 is perpendicular to the plane of arc 612. The closest point on arc 614 to point p1 is designated s1; and the closest point on arc 612 to point p2 is designated s2.

Generally, a point is adjusted if both that point and an adjacent point have been marked for smoothing. A point may be marked for smoothing if it satisfies each of the three tests or conditions given above, i.e., both p0p1 and p1p2 are lines; Max{d1,d2}<0.0005 inch; and angle θ>145 degrees. In the example shown in FIG. 7, point p1 may be adjusted if p1 has been marked for smoothing and either or both of p0 and p2 has been marked for smoothing. Point p1 may be adjusted, if at all, along an adjustment vector v1 extending from p1 to s1. Similarly, point p2 may be adjusted if p2 has been marked for smoothing and either or both of p1 and p3 has been marked for smoothing. Point p2 may be adjusted, if at all, along an adjustment vector v2 extending from p2 to s2.

After the adjustments associated with arcs 612 and 614, the process continues with subsequent adjustments associated with arcs formed by the next set of four points, i.e., points p1, p2, p3 and p4. That is, adjustments may be made based upon an arc defined by points p1, p2 and p4 and an arc defined by points p1, p3 and p4. The adjustment process may continue indefinitely with calculations based upon subsequent sets of four points along the trajectory.

The magnitude of the adjustment of a point's position along an adjustment vector may be dependent upon whether one of the two adjacent points is unmarked for smoothing. More particularly, if a marked point lies immediately after or before an unmarked point, i.e., the marked point lies between an unmarked point and another marked point, then the position of the marked point may be adjusted by half the length of the adjustment vector. That is, the marked point may be moved half way along the adjustment vector. In equation form, the position of the point may be calculated as p=p+0.5*v. That is, the point is moved with a coefficient or factor of 0.5. Otherwise, if a marked point lies between two other marked points, then the position of the point is adjusted twice with a coefficient or factor of approximately 0.19 in each of the two adjustments.

To better illustrate the embodiment of FIG. 7, various adjustment scenarios are described below. The check to verify that the total adjustment is less than an adjustment limit, such as 0.0002 inch, is omitted for simplicity and ease of illustration.

Case 1:

Condition: p0 is not marked for smoothing; p1 is marked for smoothing; p2 is not marked for smoothing.

Result: Because p1 is not adjacent another marked point, p1 is not adjusted even though it is marked for smoothing.

Case 2:

Condition: p0 is not marked for smoothing; p1 and p2 are marked for smoothing; p3 is not marked for smoothing.

Result: p1=p1+0.5*v1; p2=p2+0.5*v2.

Case 3:

Condition: p0 is not marked for smoothing; p1, p2 and p3 are marked for smoothing; p4 is not marked for smoothing.

Result: p1=p1+0.5*v1; p2=p2+0.1877*v2+0.1877v2'; p3=p3+0.5*v3, wherein v1 and v2 are calculated from points p0p1p2p3, and v2' and v3 are calculated from points p1p2p3p4.

Case 4:

Condition: p0 is not marked for smoothing; p1, p2, p3 and p4 are marked for smoothing.

Result: p1=p1+0.5*v1; p2=p2+0.1877*v2+0.1877v2'; p3=p3+0.1877*v3+0.1877v3', wherein v1 and v2 are calculated from points p0p1p2p3, v2' and v3 are calculated from points p1p2p3p4, and v3' is calculated from points p2p3p4p5.

C. Double Arc Smoothing

In a third operation, smoothing is performed using a double arc algorithm. The third operation may include converting the lines into arcs, which are mutually tangent to each other, while maintaining a given tolerance. This third operation may include sequentially checking consecutive line target points processed in the second operation in Smoothing Queue 206 and performing the conversion of lines to arcs.

The double arc algorithm causes the final smoothed trajectory to pass through all the target points of the line segments to be smoothed. Thus, the tolerance requirements will be well satisfied.

Figure 8:
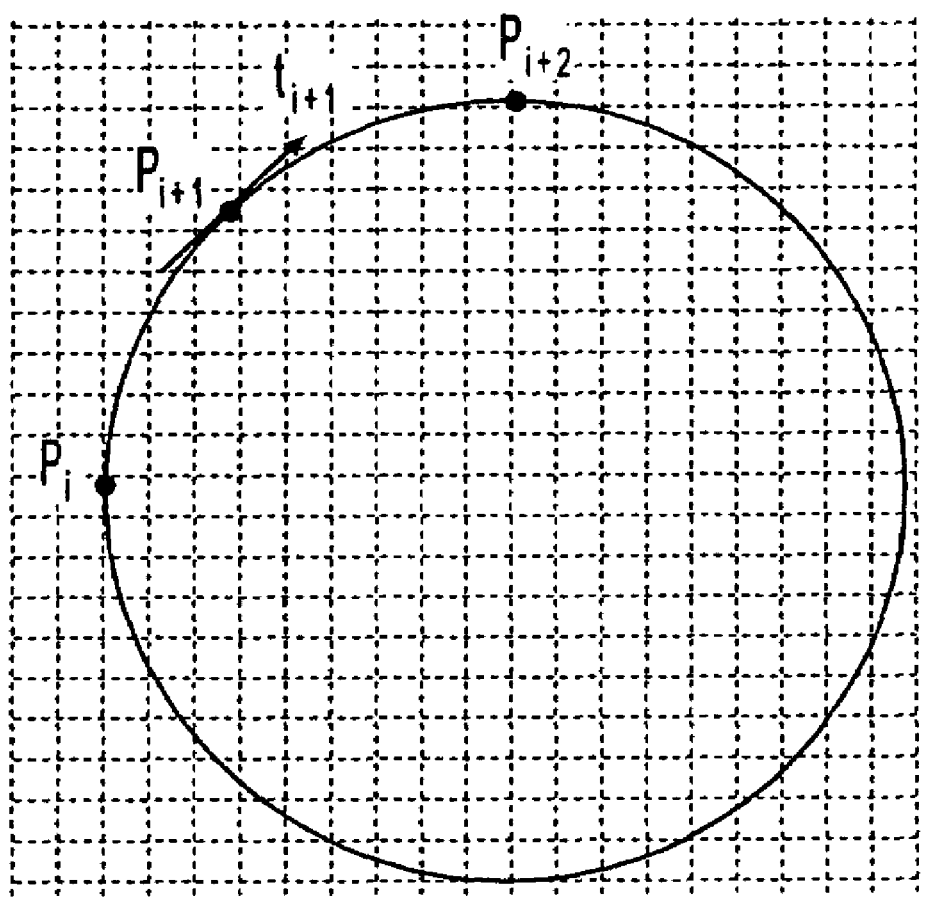
FIG. 8 is a plot illustrating one step of one embodiment of a double arc smoothing algorithm of the present invention.

The double arc algorithm may perform two functions simultaneously in a pipeline manner. First, the algorithm may determine a tangent vector at each target point of a line segment to be smoothed. Second, the algorithm may generate double arcs to replace the line segments to be smoothed. Let $p_1, p_2, p_3, p_4, p_5, p_6, \ldots, p_n$ be consecutive line target points already processed by the second operation in smoothing queue 206. The first function may perform the following steps:

If $p_i$, $p_{i+1}$ or $p_{i+2}$ is tagged "smoothing", calculate a desired tangent vector $t_{i+1}$ (FIG. 8) at point $p_{i+1}$ based on the positions of points $p_i$, $p_{i+1}$, and $p_{i+2}$. The three points $p_i$, $p_{i-1}$ and $p_{i+2}$ define the $Arc p_i p_{i+1} p_{i+2}$ and $t_{i+1}$ is the tangent vector to the arc at point $p_{i+1}$.

If none of $p_i$, $p_{i+1}$, $p_{i+2}$ is tagged "smoothing", do nothing

Increase i by 1

Repeat the above steps

The above function will create a sequence of desired tangent vectors at the target points of the line segments to be smoothed, denoted as $t_1, t_2, t_3, t_4, t_5, t_6, \ldots, t_n$. The tangent vectors may be referred to as "desired tangent vectors" because the direction changes of these vectors are gradual, which further smoothes the curvature changes in the smoothed trajectory.

The second function may perform the following steps:

If $p_i$, $p_{i+1}$ and $p_{i+2}$ are marked for smoothing and the corresponding desired tangent vectors $t_i$, $t_{i+1}$ and $t_{i+2}$ have been calculated for $p_i$, $p_{i+1}$ and $p_{i+2}$, then create a pair of three-dimensional arcs $a_{i1}$ and $a_{i2}$ such that:

$a_{i1}$ starts at point $p_i$ and is tangent to the tangent vector $t_i$ $a_{i1}$ is tangent to $a_{i2}$ at a point p between $p_i$ and $p_{i+2}$ $a_{i2}$ starts at point p, ends at point $p_{1+2}$, and is tangent to the tangent vector $t_{i+2}$.

Check the shortest distance (d) between $p_{i+1}$ and the closest arc. If the distance is within a given tolerance, the double arcs are valid.

If the double arcs between $p_i$ and $p_{i+2}$ are invalid, then create a pair of three-dimensional arcs $a_{a1}$ and $a_{a2}$ between $p_i$ and $p_{i+1}$ such that:

$a_{i1}$ starts at point $p_i$ and is tangent to the tangent vector $t_i$ $a_{i1}$ is tangent to $a_{i2}$ at a point p' between $p_i$ and $p_{i+1}$ $a_{i2}$ starts at point p', ends at point $p_{i+1}$, and is tangent to the tangent vector Repeat the above steps to generate double arcs between $p_{i+1}$ and $p_{i+2}$ Increase i by 2

Repeat the above steps

Figure 9:
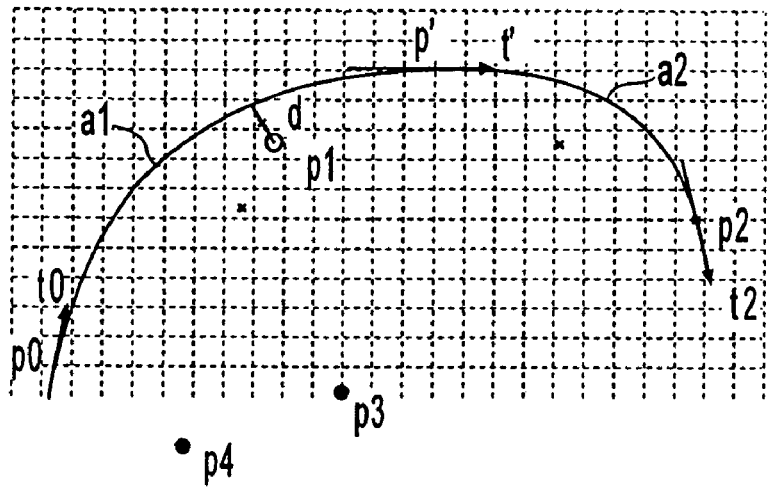
FIG. 9 is a plot illustrating another step of one embodiment of a double arc smoothing algorithm of the present invention.

The operation of the second function in the embodiment described above is illustrated in FIGS. 9 and 10. In FIG. 9, p0, p1 and p2 are marked for smoothing. A pair of three-dimensional arcs a1 and a2 are created such that arc a1 starts at point p0 and is tangent to tangent vector t1; arc a1 is tangent to arc a2 at a point p' between p0 and p2; and arc a2 starts at point p', ends at point p2, and is tangent to the tangent vector t2. If a distance d between p1 and the closer arc a1 of the two arcs is within a given or predetermined tolerance, then the double arcs a1 and a2 are valid.

If, on the other hand, the double arcs a1 and a2 are invalid, i.e., the distance d is not within the given tolerance, then another pair of three-dimensional arcs a3 and a4 (FIG. 10) are created such that arc a3 starts at point p0 and is tangent to tangent vector t0; arc a3 is tangent to arc a4 at a point p" between p0 and p1; and arc a4 starts at point p", ends at point p1, and is tangent to the tangent vector t1. The above steps may then be replicated in order to create yet another pair of three-dimensional arcs (not shown) between points p1 and p2. Any or all of arcs a1, a2, a3 and a4 may be circular arcs, and each of the arcs may have a different, respective radius.

With the double arc smoothing thus completed between points p0, p1 and p2, the above-described second function may be repeated for the next three points along the trajectory, i.e., points p2, p3 and p4. Further, the second function may be repeated for each subsequent set of three points along the trajectory.

Figure 10:
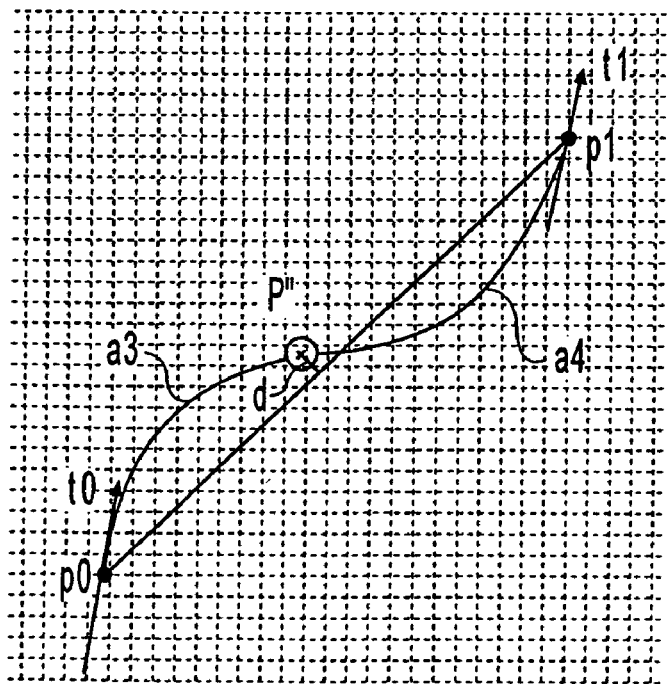
FIG. 10 is a plot illustrating yet another step of one embodiment of a double arc smoothing algorithm of the present invention.

The above-described double arc smoothing embodiment is directed to the case in which p0, p1 and p2 are each marked for smoothing. Assume now that, of the four points p0, p1, p2 and p3, p1, p2 and p3 are marked for smoothing. Tangential vectors t0 and t1 may be derived from the arc defined by p0, p1, p2, and tangential vector t2 may be derived from the arc defined by p1, p2, p3. The following five steps may be taken:

1. Double arcs, i.e., arc a1 from p0 to p' and arc a2 from p' to p2, which are tangential at point p' may be generated from (p0, p2, t0, t2), as shown in FIG. 9.
2. The shortest distance between p1 and the closer of the two double arcs may then be checked. If the distances in the x, y and z directions are less than a predetermined distance, such as 0.0002 inch, then the double arcs a1 and a2 are valid.
3. If the double arcs a1 and a2 are invalid, then double arcs a3 and a4 are generated between points p0 and p1 and based upon tangent vectors t0, t1. The two arcs a1 and a2 may be tangential at point p".
4. There may be a tolerance check for the double arcs. A distance d in FIG. 10 is the shortest distance between point p" and a line extending between points p0 and p1. If distance d is less than a predetermined distance, such as 0.0005 inch, then the double arcs a3 and a4 are valid. Otherwise, if the double arcs a3 and a4 are invalid, then define the trajectory between points p0, p1 as a line extending between points p0 and p1.
5. Repeat steps 3 and 4 to generate double arcs between p1 and p2 based upon tangent vectors t1 and t2.

II. Additive Lookahead

Figure 11:
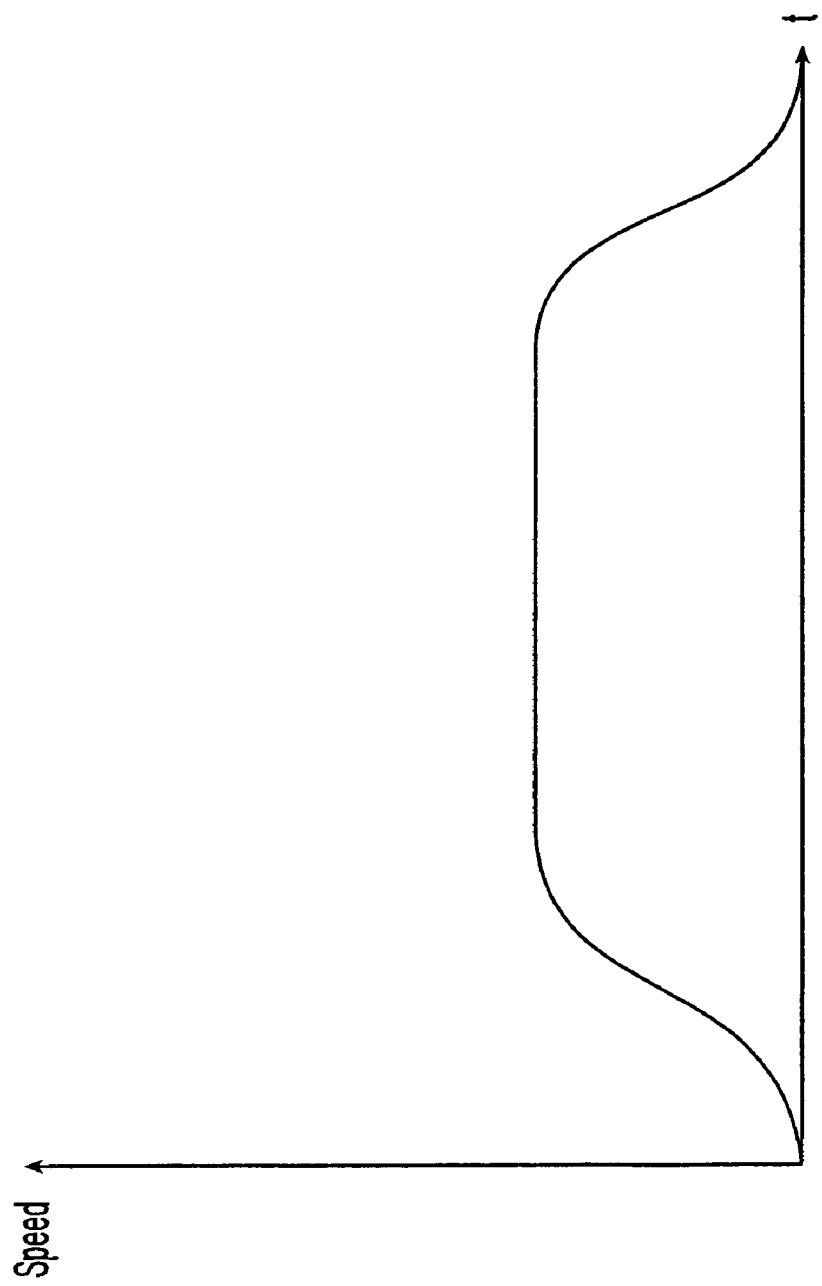
FIG. 11 is a plot of the tool velocity versus time, also referred to as the S-Curve.

In an additive lookahead operation within Lookahead Queue 208, it is ensured that there is enough distance to accelerate or decelerate between all velocity changes in the program data. This has advantages in that the machine bumping and dwell marks may be reduced, and the surface finish in machining may be improved. For each programmed move, a stop distance is computed that defines the distance required to decelerate the axes to zero velocity according to S-curve acceleration. It is referred to as S-Curve because the acceleration/deceleration part of the velocity profile (velocity plotted versus time) illustrated in FIG. 11 looks like an "S" instead of a straight line. The stop distance may be determined by the lower of: a) the maximum move velocity determined by the angle between the current and next moves; and b) the maximum move velocity for the path curvature determined by the machine model.

The additive lookahead function may include searching in Lookahead Queue 208 for velocity and distance information and determining whether there is enough distance for the machine to accelerate/decelerate properly from one motion command to the next.

There is a mathematical conversion between the stop distance and the velocity. The proper velocity may be calculated from the stop distance and the S-Curve, as discussed in more detail below.

The additive lookahead algorithm may require knowledge of the maximum velocities allowed for different part geometries. A tolerance/arc radius/velocity table may be built for this purpose. The table may provide the maximum allowable velocities for arcs of different radii or curvatures with different tolerance requirements.

A. Stop Distance and Stopper

Figure 12A:
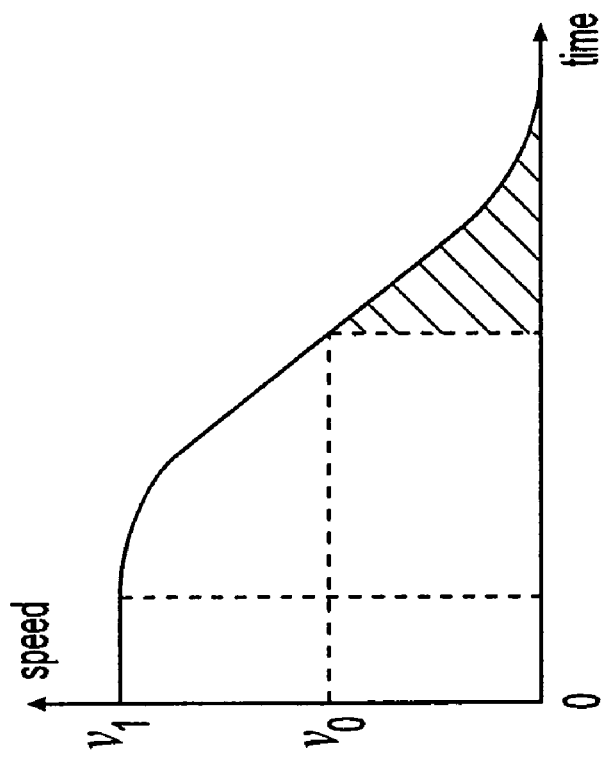
FIG. 12a is another plot of the tool velocity versus time, also referred to as an S-Curve.
Figure 12B:
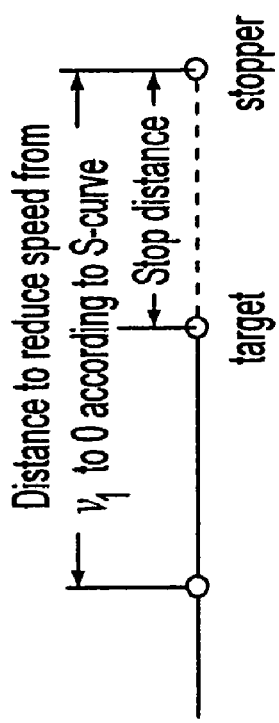

The additive lookahead algorithm introduces the concepts of stop distance and stopper. The stop distance of a motion command with nominal feedrate $v_1$ (FIG. 12*a*) and end point speed $v_o$ may be defined as the distance traveled from a target point (FIG. 12*b*) to the point at which a full stop can be achieved according to the S-curve speed profile, as illustrated by the shaded area in FIG. 12*a*. Stopper, which is a virtual target point for a motion command, may be selected such that if the system reduces speed from nominal feedrate $v_1$ and comes to a full stop at the stopper according to the S-curve, it passes the actual target point at the desired end point speed $v_0$. The stop distance may be defined as the distance between the target point and the stopper.

Once the nominal feedrate $v_1$ of a motion command is determined, there exists a one-to-one mapping between the stop distance and the end point speed $v_0$, assuming that the S-curve speed profile is fixed, i.e., the maximum acceleration and jerk are fixed. It may be assumed herein, unless otherwise stated, that the S-curve profile is fixed. Therefore, the stop distance has a direct correspondence to the end point speed; and if the stop distance is given, the end point speed may be accordingly uniquely determined, and vice versa. The additive lookahead algorithm may use the stop distance as a metric of end point speed, which allows the algorithm to be computationally efficient, as discussed below.

The stopper may be used in an S-curve controller to design a motion profile. The S-curve controller may aim at the stopper instead of at an actual target point. The S-curve controller may generate a speed profile in which the controlled tool passes the actual target point at the same point in time at which the tool reaches the desired slowdown speed.

B. Speed Limitations of Motion Commands

In the additive lookahead algorithm, each motion command may have four speed limitations: specified feedrate, machine allowable speed, path velocity limit and joint velocity limit. The specified feedrate may be defined as the desired feedrate value given by the upper-level motion planning. The machine allowable speed is a machine limitation on the speed, and depends on the hardware of the machine and laws of physics. The path velocity limit is a limit for arc motion. The path velocity limit may depend on the arc radius and tolerance specification. The larger the arc radius and tolerance are, the larger the maximum path velocity limit is. The joint velocity limit may be defined as a speed limit at the joint of two consecutive motion commands. The joint velocity limit may depend on the angle between the two motions and the tolerance specification. The larger the tolerance and the smaller the angle are, the larger the joint speed limit value is.

In the additive lookahead algorithm, the nominal feedrate is the lowest value among the specified feedrate, the machine allowable speed and the path velocity limit. For example, if the specified feedrate is higher than the machine allowable speed and the path velocity limit, the lookahead algorithm would force the feedrate to slow down to the smaller value of the machine allowable speed and the path velocity limit.

The slowdown feedrate at the end point of a motion command may depend on the joint velocity limit as well as the nominal feedrate of that motion command and the next motion command. Because the nominal feedrate is the smallest one among the specified feedrate, the machine allowable speed and the path velocity limit, slowdown may occur during a current motion segment and speedup may occur in a next motion segment, such that the feedrate for the current motion segment may be less than the nominal value. The additive lookahead algorithm may use the nominal and slowdown feedrates to calculate the stop distance.

C. Valid Stop Distance Condition

Figure 13:
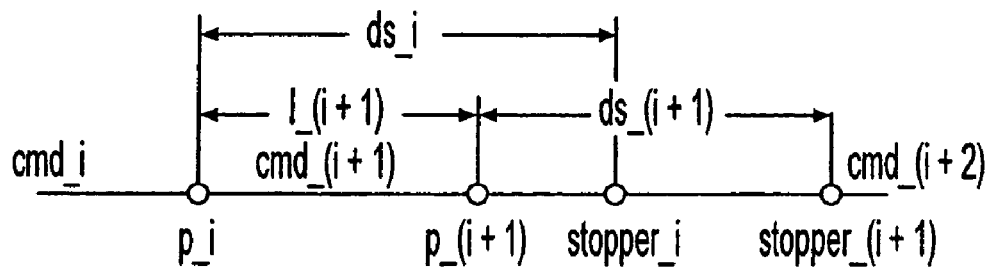
FIG. 13 is a diagram illustrating the concept of stop distance.

The lookahead algorithm may ensure that the distance between the tool and some location ahead of the tool is sufficient to allow the speed of the tool to be changed to a desired level by the time the tool arrives at the location. This condition may be referred to as a "valid stop distance condition" with regard to the additive lookahead algorithm and may be defined mathematically by equation (1):

$$ds_i \leq l_{i+1} ds_{i+1} \tag{1}$$

where ds and l represent the stop distance and the length of a motion segment, respectively, and subscripts i and i+1 represent the index of motion commands. In the diagram of FIG. 13, motion command cmd_i has an end point at p_i, stopper point at stopper_i, and stop distance ds_i. If the stop distance of cmd_i does not exceed the sum of the length and stop distance of cmd_(i+1), or if the stopper_i is in front of the stopper_(i+1), then cmd_i satisfies the valid stop distance condition.

The valid stop distance condition can also be explained in another way as illustrated by equation (2):

$$ds_i - ds_{i+1} \leq l_{i+1} \tag{2}$$

Because the stop distance ds_i and ds_(i+1) correspond to the feedrate at the end point p_i of motion cmd_i and the feedrate at the end point p_(i+1) of motion cmd_(i+1) respectively, equation (2) indicates that the segment length l_(i+1) is long enough to accommodate a speed slowdown from the feedrate at the point p_i to the feedrate at the point p_(i+1).

C. Additive Lookahead vs. Non-Additive Lookahead

A difference between a TBC additive lookahead algorithm and a non-additive lookahead algorithm is that the additive lookahead algorithm generates an S-curve targeting the stopper and uses only part of the S-curve so that the speed is reduced from $v_1$ to $v_0$ at the target point. The non-additive lookahead generate an S-curve targeting the actual target point and the speed is reduced from $v_1$ to $v_0$ at the target point.

Figure 14:
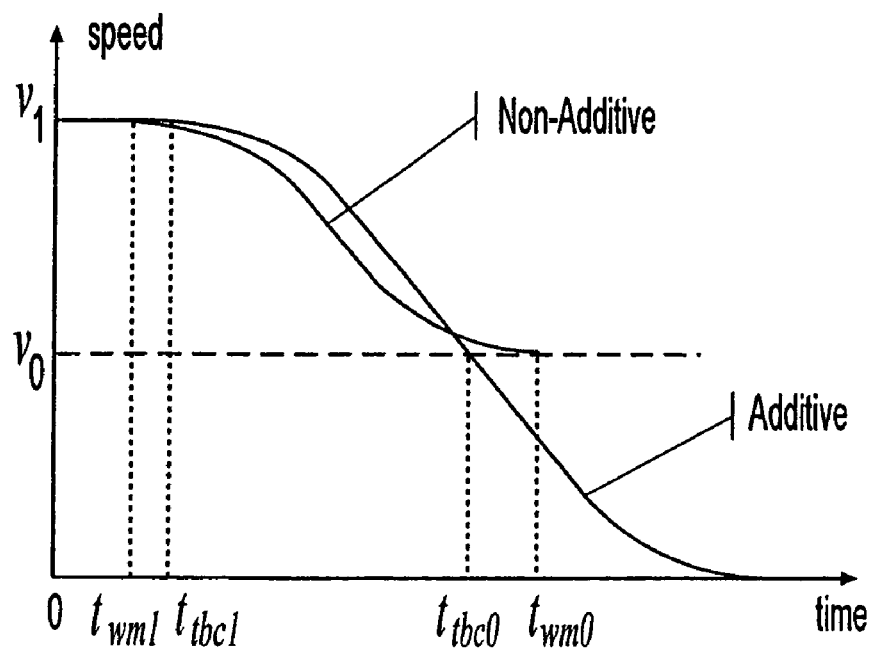
FIG. 14 is yet another plot of the tool velocity versus time for both additive and non-additive lookahead algorithms.

FIG. 14 shows a comparison between the additive and non-additive S-curve speed profile. The speed is reduced from $v_1$ to $v_0$ at the target point in both profiles. However, in the additive S-curve, the slowdown occurs between time $t_{tbc1}$ and time $t_{tbc0}$, while in the non-additive S-curve, the slowdown occurs between time $t_{wm1}$ and time $t_{wm0}$. Thus, the non-additive S-curve requires a longer time and a longer distance than the additive S-curve in order to achieve the same reduction in speed from $v_1$ to $v_0$.

In the additive lookahead process, the continuous trajectory changes may affect the previously-processed commands. Each time a new command is added to the lookahead queue and a stop distance is calculated for the new command, all the commands in the queue which have already been processed may be reviewed to see if the previously-calculated stop distances for these commands need to be updated or not.

Figure 15:
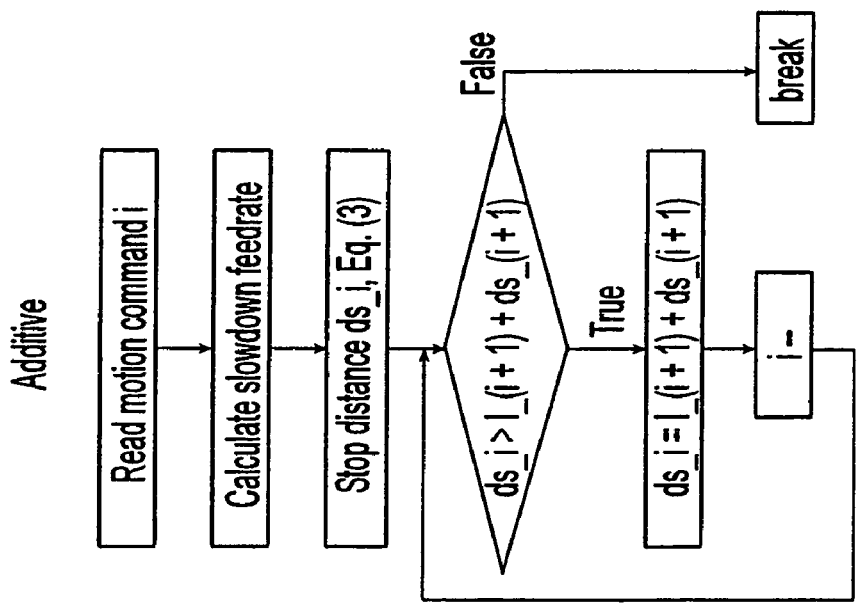
FIG. 15 is a flow chart of one embodiment of an additive lookahead algorithm of the present invention.

When a new command $cmd_i$ is received and processed, it has a path length l_i, and a stop distance ds_i. The additive lookahead algorithm may perform the following steps (FIG. 15):

Check command $cmd_{i-1}$ to see if it meets the "valid stop distance condition", i.e., if ds_(i−1) is equal to or less than the sum of l_i and ds_i.

If command $cmd_{i-1}$ does not meet the "valid stop distance condition", i.e., ds_(i−1) is greater than the sum of l_i and ds_i, then replace the stop distance ds_(i−1) for command $cmd_{i-1}$ with the sum of l_i and ds_i.

If command $cmd_{i-1}$ meets the "valid stop distance condition", i.e., ds_(i−1) is equal to or less than the sum of l_i and ds_i, then the stop distance ds_(i−1) for command $cmd_{i-1}$ may remain unchanged, and the update operation is complete.

If (i−1) is equal to 0, the update operation is complete.

i—(decrement the value of i) and repeat the above steps.

When the additive lookahead function is sequentially reviewing backward the commands previously processed in the Lookahead Queue 208, checking the "valid stop distance condition," and updating the stop distance of the commands, the updating operation may stop after the first command that meets the "valid stop distance condition" is found. Because this command meets the "valid stop distance condition," the stop distance of this command may remain unchanged. Further, because this command meets the "valid stop distance condition," all the commands previous to it met, and still meet, the "valid stop distance condition," and none of the previous commands may need to change.

In the additive lookahead (FIG. 15), only the third step, i.e., the step of calculating the stop distance ds_i, may require a lot of computation, and may be calculated as shown in equation (3) wherein J is the jerk. This calculation may be needed only once for every motion command, and there may be no need to repeat it.

$$ds = \begin{cases} \frac{1}{6}J\left(\frac{2v_0}{J}\right)^{\frac{3}{2}} & v_0 < \frac{1}{2}v_1 \\ v_1\sqrt{\frac{v_1}{J}} + \frac{1}{6}J\left(\frac{2(v_1-v_0)}{J}\right)^{\frac{3}{2}} - \left(\frac{2(v_1-v_0)}{J}\right)^{\frac{1}{2}}v_1 & v_0 \geq \frac{1}{2}v_1 \end{cases} \quad (3)$$

In general, the additive lookahead algorithm may be more computationally efficient than the non-additive lookahead algorithm due to the additive lookahead algorithm having only one heavy load step which is outside the recursive loop and is only performed once. The additive lookahead algorithm also needs less distance to reduce a same amount of speed, as shown in FIG. 14, which means fewer previous motion commands need to be modified.

III. Motion Kernel

The motion kernel module may perform the tolerance based motion control and may control the motion associated with program lines and arcs. The motion kernel provides predictive and true arc motion, wherein a line or an arc is the basic trajectory unit. The control may push the axes along the programmed trajectory, correcting for deviations as they are encountered.

The predictive TBC motion control may be based on a different mechanism that recognizes line/arc data (no pre-computed interpolation points) and directly pushes the axes along the line/arc trajectory. At every control cycle (which may have a period of 200 μsec, for example), the control may read the position feedback, may compare the current position with the commanded trajectory (a line or an arc), and may determine a point on the trajectory that is the point closest to the actual current position. This point may be defined as the ideal current position. The difference between the actual current position and the ideal current position may be defined as the instantaneous random position error or tolerance error. The instantaneous random position error, also referred to simply as the "position error," may be thought of as the deviation of the actual current position from the line/arc trajectory.

The TBC tolerance error is the vector difference between the actual current position and the ideal current position which may be dynamically calculated in real time. In a TBC control system, the ideal current position may be calculated every control cycle, and the tolerance error may be directly corrected by TBC. Moreover, in a TBC system, the tolerance errors for different axes may be handled coordinately.

The TBC predictive motion control, at every control cycle, may perform the following steps:

Calculate the three-dimensional tangential velocity at the ideal current position of the trajectory according to S-Curve Calculate the instantaneous tangential and centripetal acceleration forces and their predictive compensate vectors Calculate the instantaneous random position error Determine a three-dimensional random corrective velocity Combine the tangential velocity, the predictive compensate vectors and the random corrective velocity together and issue the resultant velocity to push the axes along the trajectory The TBC motion kernel of the present invention may take the motion commands from the Lookahead Queue 208 and control the servo system to track the contour trajectory. The TBC motion control is different from non-TBC motion control in that it is a closed-loop contour tracking control. A comparison between non-TBC motion control and TBC motion control is provided below.

A. Non-TBC Motion Control Structure

In order to track a three-dimensional contour trajectory, a conventional control system may decompose the three-dimensional contour into X/Y/Z axes and interpolate the X/Y/Z motion with respect to time. Each axis may have its own time based reference trajectory and may use feedback and feedforward control to track its own motion trajectory independently. Ideally, if each axis tracks its reference trajectory perfectly, the resulting three-dimensional contour would also be perfectly followed. Due to the existence of disturbances, shown in FIG. 16, and modeling errors, perfect tracking is normally not achievable and there may be tracking errors between the actual axis motions and reference trajectories. There may be an attempt to minimize the tracking error in each axis without any teamwork or coordination among the three axes. The trajectory of each axis may be tracked without knowing or caring what the state of the trajectory in other axes is. For example, even if the trajectory in one axis meets a large resisting force and lags behind its reference trajectory, there may be an attempt to track the preset trajectories of the other two axes. The result is that even though the trajectory may be tracked perfectly for two of the three axes, the actual contour that is achieved may still deviate from the reference contour significantly.

Figure 16:
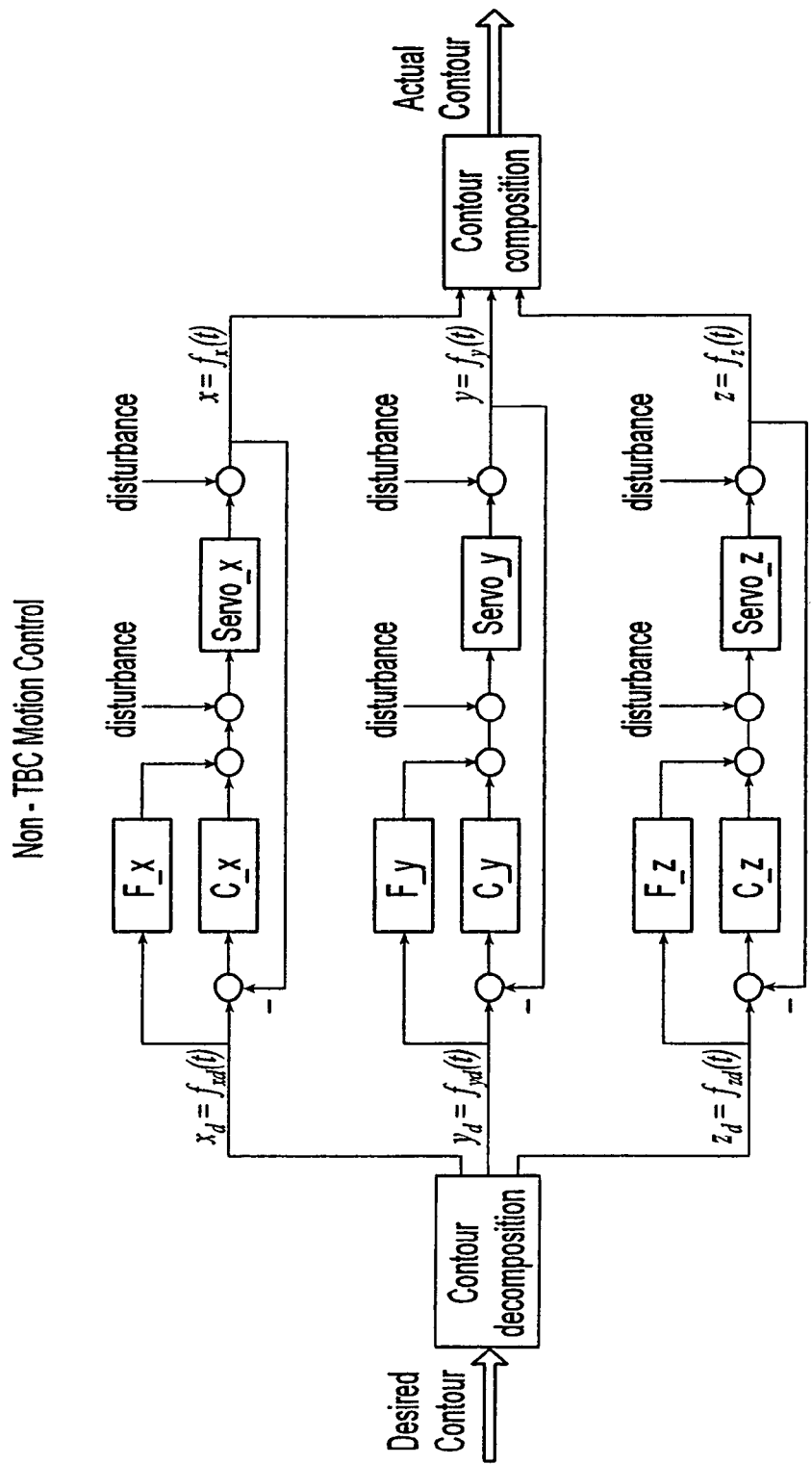
FIG. 16 is a block diagram of one embodiment of a non-TBC motion control arrangement.

The motion control system illustrated in FIG. 16 may be time deterministic. That is, the x/y/z axis motion trajectories may be time based and the entire system's runtime may be accurately determined beforehand. F_x, F_y and F_z may indicate feedforward controllers for each of the three axes; and C_x, C_y and C_z may indicate feedback controllers for each of the three axes.

B. TBC Motion Control Structure

Figure 17:
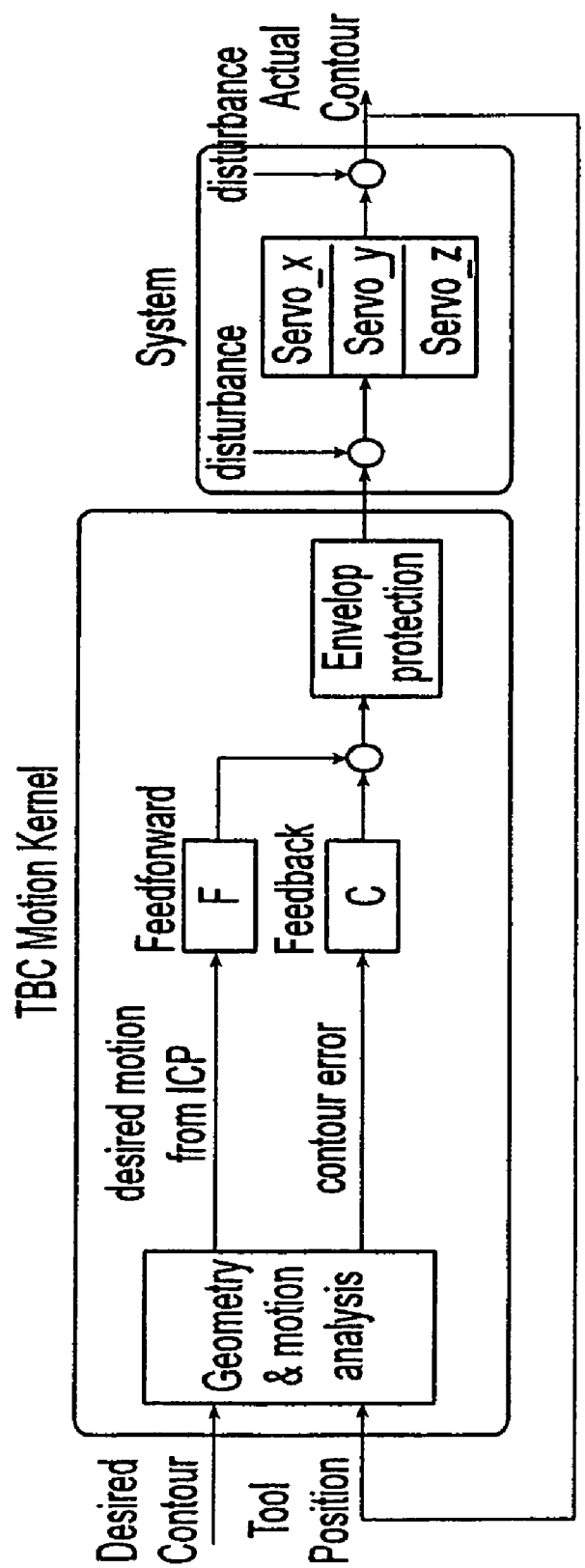
FIG. 17 is a block diagram of one embodiment of a TBC motion control arrangement of the present invention.

TBC motion control does not involve decomposing a three-dimensional contour into three independent time-based axis trajectories. Rather, TBC motion control may compare the actual contour position with a reference contour and determine a control signal to minimize the contour error. One embodiment of TBC motion control structure is shown in FIG. 17, where all signals are vectors. In contrast, in the non-TBC motion control structure shown in FIG. 16, signals are scalars.

The TBC motion control structure of FIG. 17 may employ contour-based feedback plus feedforward control. The contour tracking may be closed-loop, and true arc motion may be possible. That is, the tool may be commanded to follow an arced trajectory rather than a trajectory formed by a series of linear segments that approximate an arced trajectory. TBC motion control may not be time deterministic, and may be capable of on-the-fly feedrate adjustments.

Figure 18:
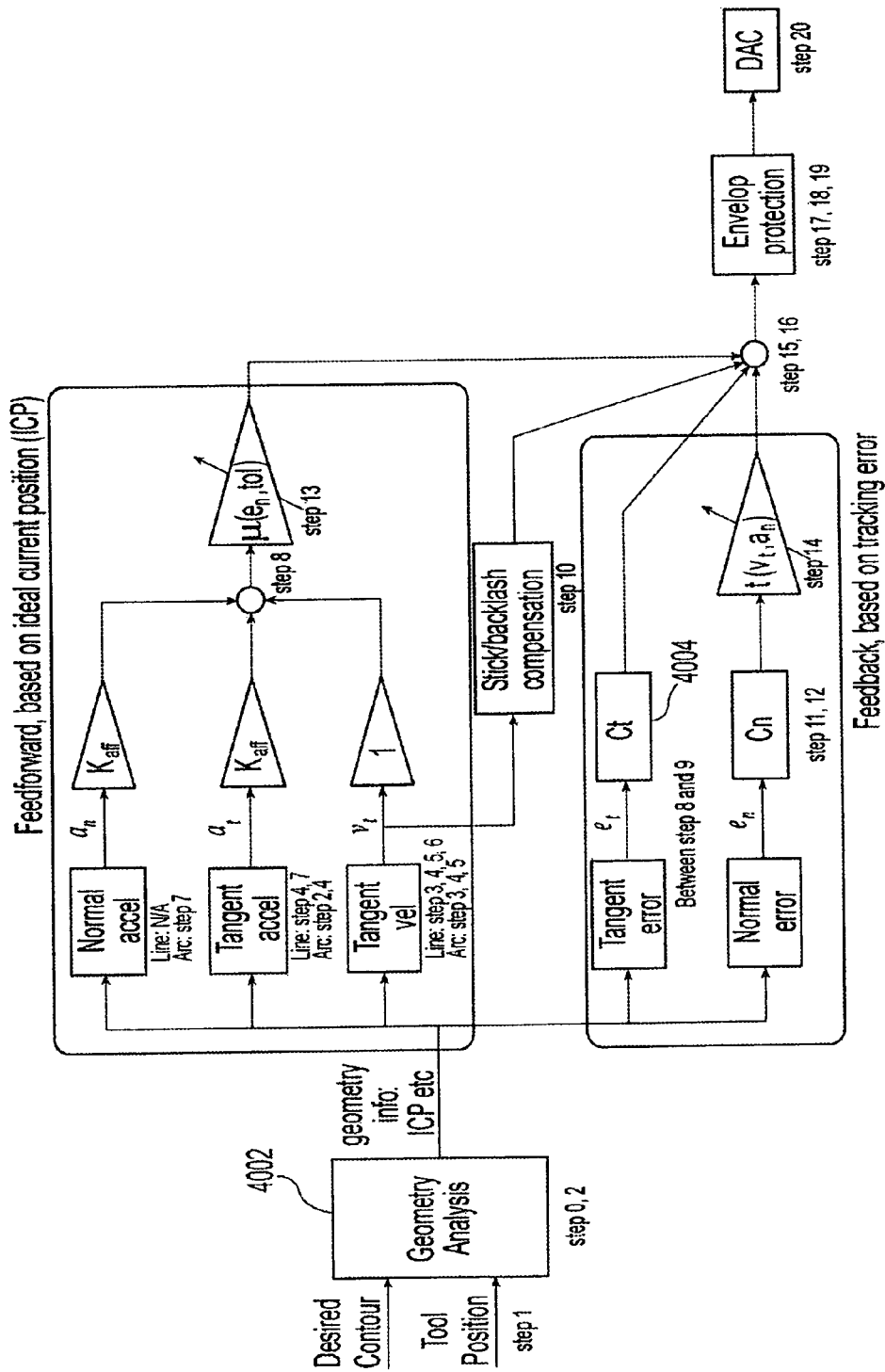
FIG. 18 is another block diagram of the TBC motion control arrangement of FIG. 17.

At every control cycle, such as every 200 usec, the controller may read the actual contour position feedback, compare the actual position with the reference contour, and find out the closest point on the reference contour to the actual position. This point is defined as the ideal current position (ICP). The controller may include three functional blocks: feedforward, feedback and stick friction/backlash compensation as illustrated in FIG. 18 and described below.

At every control cycle, the controller may calculate the desired motion based on the ICP (including acceleration and velocity in both normal and tangential directions), and may include a feedforward controller to convert the desired motion into a velocity control signal. A runtime feedrate adjuster may also be added to adjust the feedrate (velocity) for tolerance control purposes.

The controller may also calculate the tracking errors in both normal and tangential directions at every cycle. The error in the normal direction is the distance from the actual contour position to the ICP, i.e., the tolerance error or contour error. The error in the tangential direction is defined as the amount of path length that the ICP lags behind. Because the normal error may be important to the system performance, the TBC controller may include two different feedback controllers for the normal and tangential errors and may convert the tracking errors into a velocity control signal. The stick friction and backlash compensation may further improve the accuracy of the machine tool.

As compared with the non-TBC motion control, an advantage of the TBC motion control is the closed-loop structure. The closed-loop contour tracking control may coordinate the three axes and minimize the contour error. For example, if the x-axis has a large resisting force and lags behind its reference trajectory, the other two axes could slow down to match the x-axis motion so that the actual contour follows the reference contour. The TBC motion kernel may also enable true arc motion because the centripetal acceleration may be considered in the control.

Because the desired motion at each control cycle is based on the contour, the ICP, and the current system condition, such as the tolerance error, the system may no longer be time deterministic. On-the-fly feedrate adjustment may be possible. When the contour/tolerance error is below the specified value, the system feedrate may be increased. Conversely, when the contour/tolerance error exceeds the specified value, the feedrate may be reduced such that the error is also reduced. In other words, the system may maximize the feedrate while maintaining the contour/tolerance error within a specified range for optimal system runtime or throughput.

C. TBC Geometry Analysis

1. Motion Command Pre-Analysis

Figure 19:
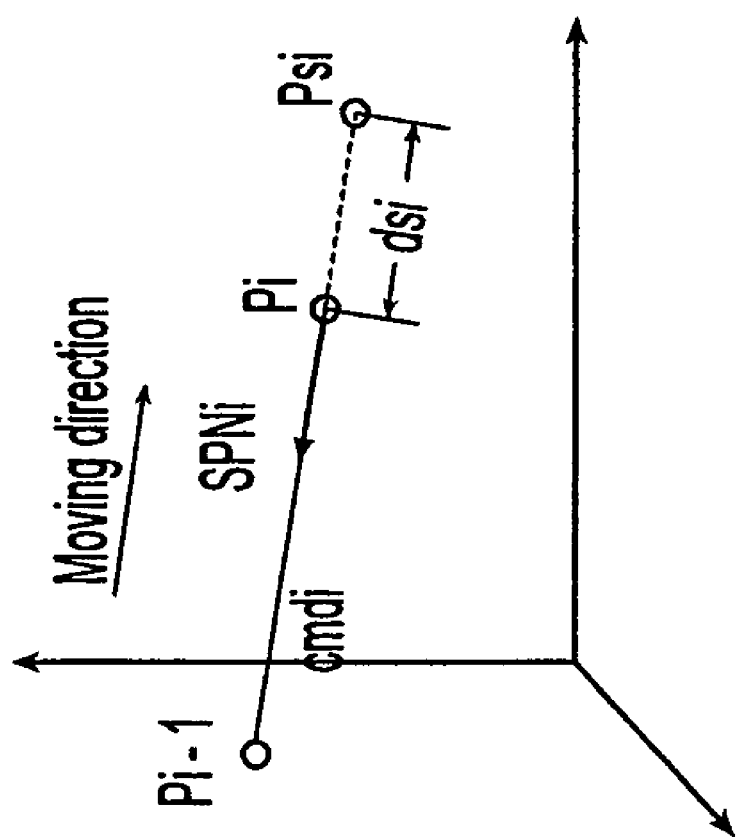
FIG. 19 is a plot illustrating the calculation of the stopper plane normal direction for line motion.

Before executing any motion command, the TBC motion kernel may load the command and analyze the geometry. The stopper plane normal (SPN) direction and stopper position may be calculated in the pre-analysis and may be used through the entire executing period until this motion command is finished. For a line motion, the SPN may be calculated as indicated by equation (6) and shown in FIG. 19, which illustrates the line motion geometry pre-analysis:

$$SPN_i = \frac{P_{i-1} - P_i}{\|P_{i-1} - P_i\|} \quad (6)$$

Figure 20:
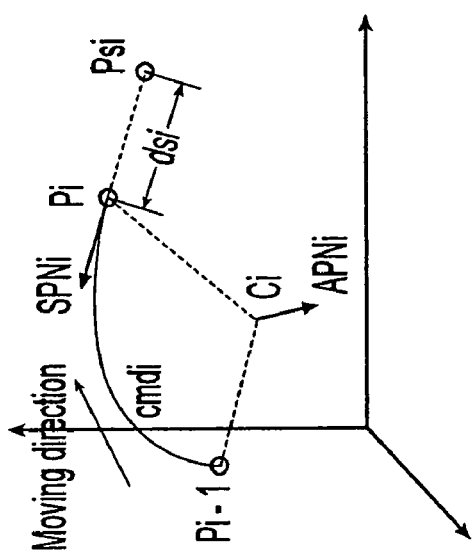
FIG. 20 is a plot illustrating the calculation of the stopper plane normal direction for arc motion.

For an arc motion, the SPN may be calculated as indicated by equation (7) and shown in FIG. 20, which illustrates arc motion geometry pre-analysis, where APN stands for the unit direction vector of the arc plane normal direction, and C stands for the center of the arc.

$$SPN_i = -APN \times \frac{P_{i-1} - C_i}{\|P_{i-1} - C_i\|} \quad (7)$$

The stopper position Psi may be calculated as indicated by equation (8) for both line and arc motions.

$$Ps_i = P_i - ds_i \cdot SPN_i \quad (8)$$

2. Real-Time Geometry Analysis

At each control cycle, the TBC motion kernel may read the actual contour (tool) position feedback Ptl and compare the actual position with the reference contour to find the ideal current position (ICP), contour/tolerance error ($e_n$) and the distance to the stopper (distance_to_go, d).

Figure 21:
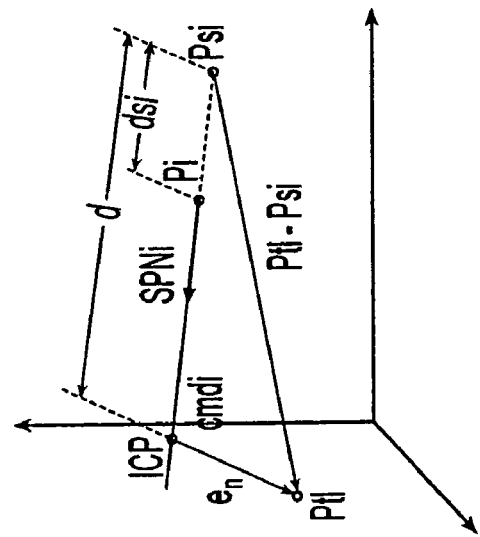
FIG. 21 is a plot illustrating line motion geometry analysis.

For a line motion, the geometry is shown in FIG. 21, which illustrates line motion geometry analysis, and may be calculated as indicated by equations (9) and (10).

$$d = <Ptl - Psi, SPN> \quad (9)$$

$$e_n = (Ptl - Psi) - d \cdot SPN \quad (10)$$

wherein $<A,B>$ is the inner product of vector A and vector B. Thus, if A=[xa, ya, za], and B=[xb, yb, zb], then $<A,B>$=xa*xb+ya*yb+za*zb. Pa is the tool position, Psi is the stopper position of the i motion segment, and SPN is the unit direction vector of stopper plane normal (SPN) direction. Equation (9) may be interpreted as the distance d being equal to the length of Ptl−Psi in the SPN direction.

Figure 22B:
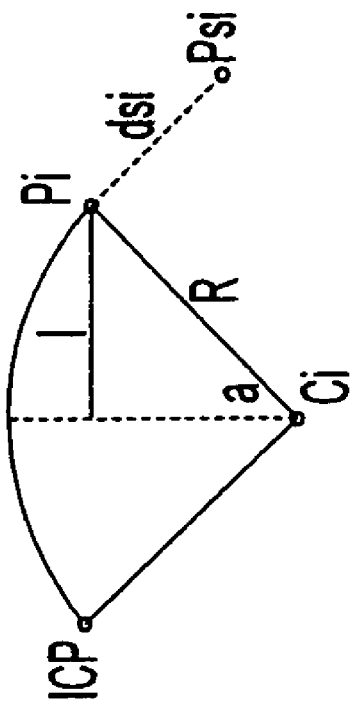
FIG. 22b is a second plot illustrating arc motion geometry analysis.
Figure 22A:
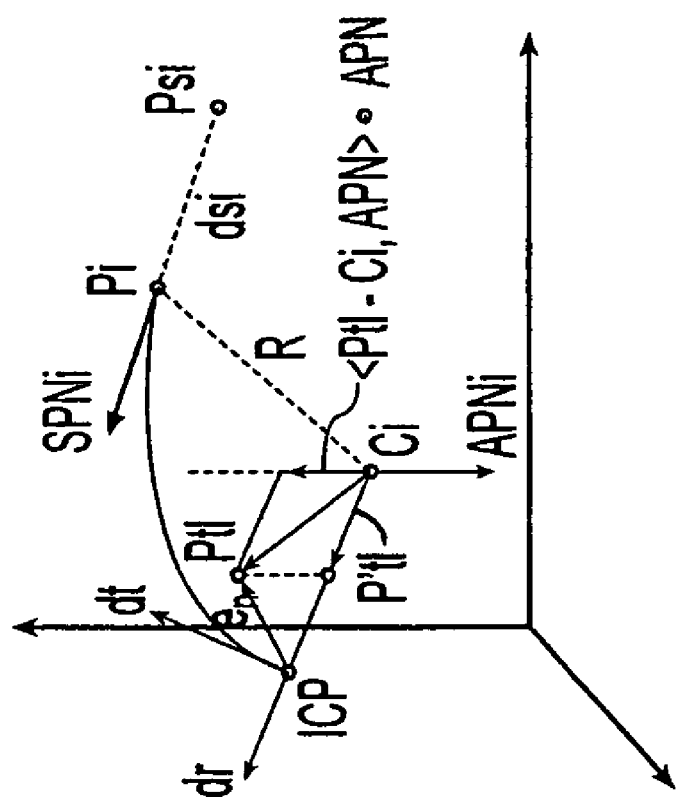
FIG. 22a is a first plot illustrating arc motion geometry analysis.

For an arc motion, because the actual contour or tool position may not be on the arc plane, the tool position may be first projected onto the arc plane, as may be calculated as indicated in equation (11) and as shown in FIGS. 22*a-b*, which are illustrative of arc motion geometry analysis.

$$P'tl = (Ptl - Ci) - <Ptl - Ci, APN> \cdot APN \quad (11)$$

The vector P'tl is the projection of (Ptl−Ci) on the arc plane. Once the vector P'tl is found on the arc plane, then ICP, the unit tangential and radial direction vectors dt and dr, and contour/tolerance error $e_n$ (also referred to as the normal error) may be determined as indicated in equations (12), (13), (14) and (15).

$$dr = \frac{P'tl}{\|P'tl\|} \quad (12)$$

$$ICP = Ci + R \cdot dr \quad (13)$$

$$dt = dr \times APN \quad (14)$$

$$e_n = Ptl - ICP \quad (15)$$

In order to calculate the distance_to_go, i.e., the path length from ICP to the stopper, the arc length between ICP and target point Pi may first be calculated. Any arc that is more than 180 degrees may be cut into two arcs. The distance_to_go may be calculated by use of the following three equations (16), (17) and (18). The meanings of the variables of equations (16), (17) and (18) may be discerned with reference to FIGS. 22*a-b*.

$$l = \frac{1}{2}\|Pi - ICP\| \quad (16)$$

-continued $$a = \sin^{-1}\left(\frac{l}{R}\right) \quad (17)$$

$$d = 2aR + dsi \quad (18)$$

D. TBC S-Curve Controller

S-Curve acceleration provides a non-linear acceleration method that softens and smoothes the transition between the at-the-speed phase and the acceleration/deceleration phase. It is referred to as "S-Curve" because the acceleration/deceleration part of the velocity profile is S-shaped instead of linear.

The S Curve velocity profile usually has seven phases: increasing acceleration; constant acceleration; decreasing acceleration; at speed; increasing deceleration; constant deceleration; and decreasing deceleration.

Non-TBC motion control systems may use the S-Curve to generate reference trajectories, i.e., scheduled position, velocity, acceleration and so on. The S-Curve is time-based and implemented outside the control loop (real-time portion). At each control cycle, based on the distance to go, the TBC S-Curve controller may calculate the desired velocity and acceleration along the reference contour trajectory. The TBC S-Curve controller may be distance-based and implemented as a real time process. The velocity may be calculated from the instantaneous path distance at every control cycle. This mechanism may reduce the velocity error accumulation, and may also support some real time requests such as on-the-fly feedrate adjustment, feed override, pause, resume and single step.

Figure 23:
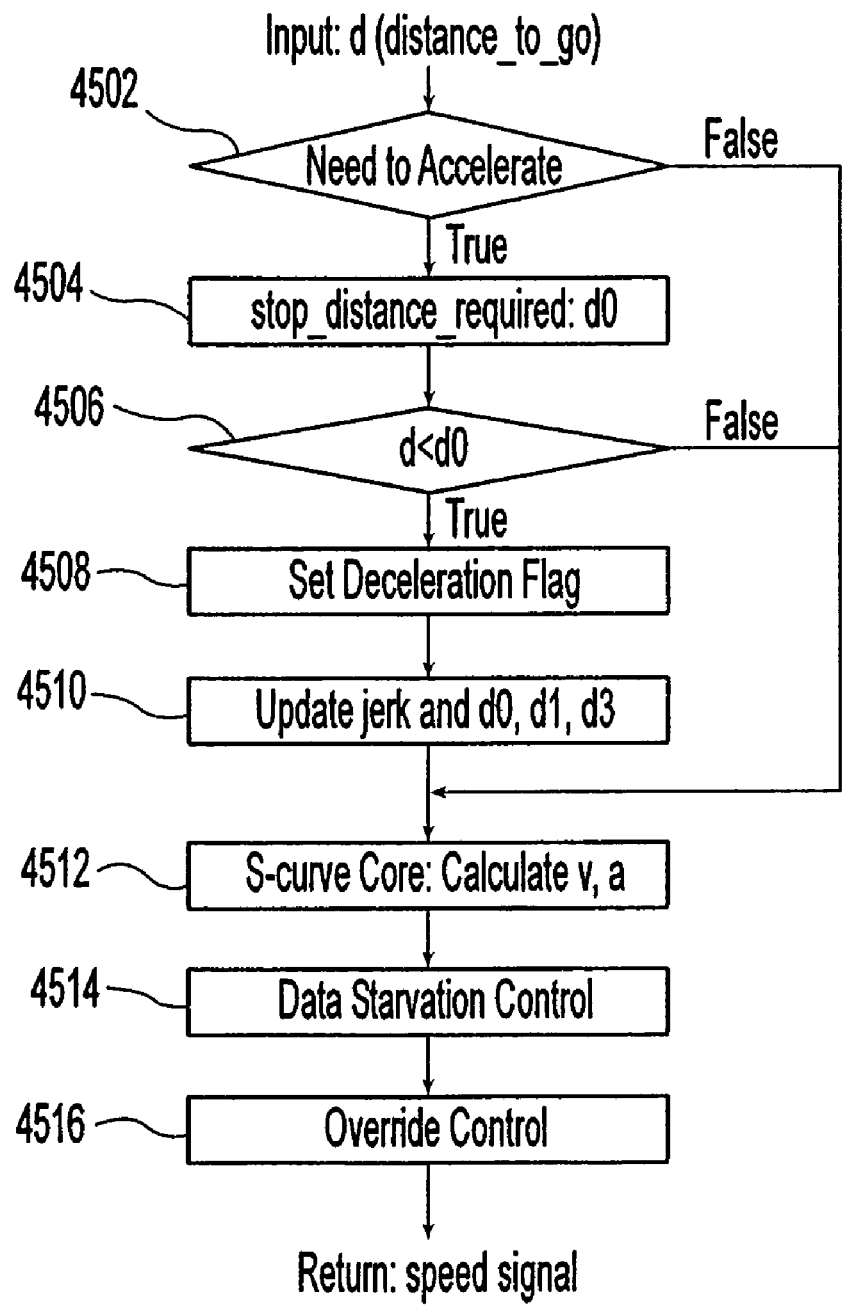
FIG. 23 is a flow chart illustrating operation of one embodiment of a TBC S-Curve Controller.

A flow chart of one embodiment of a TBC S-Curve controller is shown in FIG. 23. In a first step 4502, the flag is checked to see if the current system status is "accelerate" or "decelerate." If the status is decelerate, operation proceeds to step 4512. On the other hand, if the current status is "accelerate", the stop_distance_required is calculated in step 4504. The stop_distance_required may be defined as the minimum distance that the tool would travel according to the S-curve before the system could bring the tool to a stop. The stop distance may be a function of current speed and acceleration. In step 4506, if the given distance_to_go "d" is greater than the stop_distance_required "d0," which means that it is safe to continue to move forward, then operation proceeds to step 4512 to calculate the desired acceleration and velocity. Otherwise, if the distance_to_go "d" is less than the stop_distance_required "d0," which means the system must brake immediately, then brake information is calculated and the flag is set to decelerate in step 4508. Because the distance_to_go "d" is not enough for the system to brake according to the original S-Curve (with preset maximum jerk and acceleration), maximum jerk may be modified in step 4510 so that the system does not overshoot. Two distances, d1 and d3, which may be used to detect the S-Curve phase, may also be updated in step 4510. Step 4512 may be considered the core of the S-Curve controller. According to the current system status and the critical distances calculated beforehand, the S-Curve phase, desired velocity and acceleration may be determined in step 4512. Because the S-Curve controller runs in real time, care may be taken to ensure that the controller does not run out of data. When the total moving distance of the motion commands at the queue becomes too short, the system may need to slowdown to prevent data starvation. In step 4516, on-the-fly feedrate adjustment and user override is applied.

E. TBC Feed Forward Control

1. Feed Forward Signals and Gains

Figure 24:
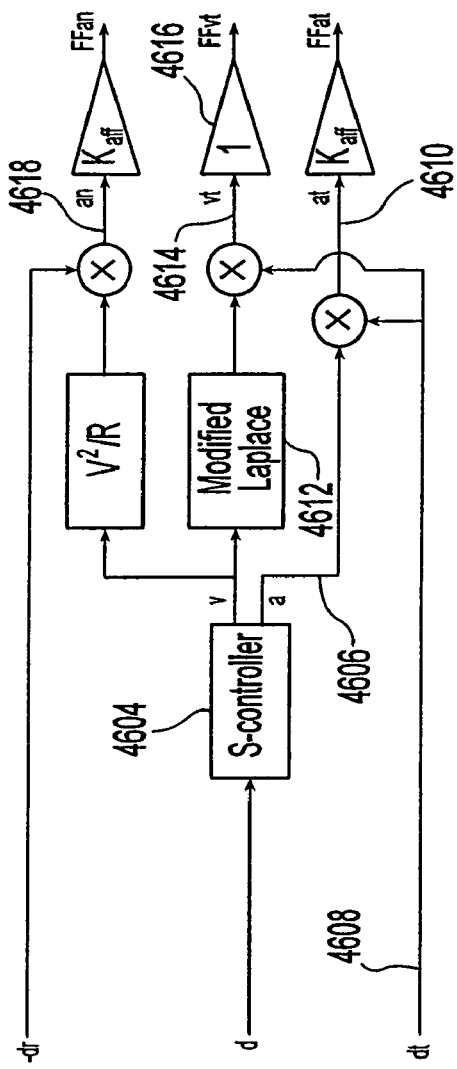
FIG. 24 is a block diagram illustrating one embodiment of a TBC control arrangement of the present invention

Feed forward may be based on the ideal current position (ICP). The calculation of the three feed forward parts, i.e., normal acceleration FFan, tangential velocity FFvt, and tangential acceleration FFat, is shown in FIG. 24, which illustrates velocity and acceleration feedforward. In FIG. 24, "d" represents the distance_to_go obtained from the geometry analysis; and dt and dr represent unit tangential and radial/normal direction vectors, respectively.

S-Curve controller 4604 may receive the distance and calculate the desired velocity v and acceleration a (both v and a are scalars) along the trajectory.

The acceleration a on line 4606 may be multiplied by the unit tangential direction vector dt 4608 to produce the tangential acceleration vector at 4610. The feed forward gain, Kaff, may convert the tangential acceleration at into a control signal FFat, which is acceptable by the servo system.

The Modified Laplace block 4612 may estimate the current velocity, compare the current velocity with last velocity command, and add a predictive compensation into the S-curve velocity command v to reduce the tangential tracking error. The compensated velocity command multiplies the unit tangential direction vector dt 4608 and becomes the tangential velocity vector vt 4614. Because the servo system takes the velocity control commands, no further conversion may be needed for the velocity vector. A feed forward gain 1 at 4616 results in a signal FFvt and may enable all channels to be at the same level.

The centripetal acceleration an 4618 may be calculated by the circular motion physics, i.e., $a_n = v^2/R$. The centripetal acceleration may be directed toward the arc center and opposite of the radial/normal direction. The same feed forward gain Kaff as applied to the tangential acceleration may be applied to convert the normal acceleration into a suitable control signal FFan.

2. Runtime Feedrate Adjuster ($\mu$)

The runtime or "on-the-fly" feedrate adjuster is a feature of TBC motion control. The TBC motion kernel may not have any predetermined reference trajectories, and desired motion may be determined inside the control loop at every control cycle based on the current system condition. Thus, the runtime feedrate adjuster may be possible.

The runtime feedrate adjuster may compare the position/tolerance error to the specified error tolerance. If the position error is bigger than, or too close to, the specified error tolerance, the runtime feedrate adjuster may slow down the feedrate to improve tracking accuracy. On the other hand, if the error is smaller than, and not too close to, the specified tolerance, the runtime feedrate adjuster may increase the feedrate to improve the system throughput. Generally, the speed of the tool may be increased if the position error is below the specified error tolerance, and the speed of the tool may be decreased if the position error is above the specified error tolerance. It is possible, in one embodiment, to not increase the feedrate even if the contour error is very small, but to retain the ability to either increase or reduce the feedrate as appropriate.

The runtime feedrate adjuster may be a constrained optimization mechanism. That is, under the constraint of the contour/tolerance error within a specified range, the runtime feedrate adjuster may maximize the feedrate to achieve optimal system throughput.

F. TBC Feedback Control

1. Normal Error Feedback Control with Variable Gain ($\tau$)

The normal error $e_n$, or contour/tolerance error, may be defined as the shortest distance from the current tool position to the reference contour, and TBC motion control may reduce this error. Because this is a three-dimensional error, the coordinated motion of the three axes together may be needed to correct it. The error may also be five or six-dimensional when additional axes, in the form of rotational axes, are included in the trajectories and in the calculations. Thus, where three dimensions or three axes are referred to in the discussion below, it is to be understood that the discussion is equally applicable to multi-dimensional systems including more than three dimensions and more than three axes.

As indicated above, a difference between the TBC and the non-TBC control is that the non-TBC control typically decomposes the three-dimensional reference contour trajectory into three independent axis motions, and controls the three axes without any knowledge of the contour/tolerance error. The TBC motion control, in contrast, may directly address the three-dimensional contour/tolerance error. The actual position of the tool may be sensed along each of three axes. A three-dimensional position error between the actual position of the tool in each of the three axes and a desired position of the tool in each of the three axes may then be calculated. A three-dimensional position error signal dependent upon the calculated three-dimensional position error may be produced. The speed and/or direction of the tool may be controlled dependent upon the three-dimensional position error signal. As described herein, and illustrated herein with various examples, three-dimensional position errors may be calculated by use of vector mathematics.

As is clear from the above description, TBC control may enable motion along one axis to affect motion control along the other two axes in real time, i.e., there may be intercoupling between the motion control of the different axes.

Figure 25:
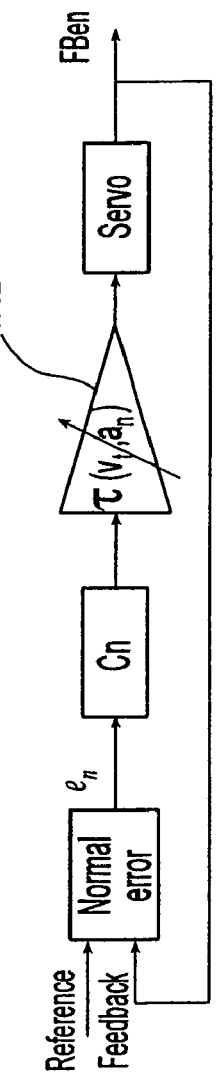
FIG. 25 is a block diagram illustrating one embodiment of an arrangement of the present invention for variable-gain feedback control of normal error.

As shown in FIG. 25, which illustrates the variable-gain feedback control of normal error, the TBC motion control may use a variable-gain feedback control to address the normal error. The error may be calculated in the real time geometry analysis 4002 (FIG. 18). A special feedback controller Cn may provide system stability and reduce the normal error.

The variable gain τ 4702 may be a function of both tangential velocity and normal acceleration. Loosely speaking, the faster the system moves, the larger the gain that is needed to correct the normal error. The larger the gain, the more quickly the normal error may be corrected.

2. Tangential Error Feedback Control

At each control cycle, the TBC may generate a tangential velocity command. The integration of the tangential velocity commands may produce a position on the reference contour, which may be considered a current target point on the reference contour. The tangential error may be defined as the path length from the ideal current position (ICP) to the current target point. A feedback controller Ct 4004 (FIG. 18) may reduce the tangential error.

3. Different Dynamic Responses of the Two Feedback Controls

The TBC feedback control may include two parts: tangential error feedback control and normal error feedback control. Instead of treating the two errors the same or equally, two feedback controllers may be provided for the errors, with each feedback controller addressing a respective one of the two errors. A first reason for the different treatment of the two errors is that the normal error may be more important than the tangential error in terms of tracking accuracy and surface finish quality, and thus more weight may be placed on the normal error. A second reason for the different treatment of the two errors is that the servo system may have limited power, and it may be desirable to use the power to do more important things first. Thus, two different feedback controllers may be used for treating normal and tangential errors. The normal error loop may have higher bandwidth or faster dynamic response. Loosely speaking, more servo power may be used to correct normal error than tangential error, and the normal error may be reduced faster than the tangential error.

G. TBC Stick Friction and Backlash Compensation

The stick friction may have a considerable influence on the motion control. To correct the stick friction effect, the TBC motion kernel may use a stick friction compensator. This compensator may be triggered when an axis changes its motion direction, i.e., across a zero velocity point. The compensation profile may have a notch shape, with the height and width of the notch being a function of the velocity and the local curvature of the trajectory.

Leadscrews may be used in machine tools as a mechanical transmission to convert rotary motion into linear motion. The inaccuracy of the ball screw and backlash may need to be compensated. The position values used by the motion kernel may be all leadscrew and backlash compensated according to the leadscrew mapping tables.

The compensation block may determine the current moving direction, which may be needed for looking up the leadscrew mapping table to implement leadscrew/backlash position compensation. The compensation block may also compensate for the stick friction.

H. TBC Control Signal Protection

The TBC motion control signal may be the sum of the feed forward control signal, the feedback control signal and the stick friction compensation signal. Before sending the control signal to the servo system through digital-to-analog converters (DACs), protection procedure may be performed to avoid overloading the machine. The protection procedure may include two steps, including a first step of limiting the control signal changing rate. The servo system may receive the velocity command, and the control signal change rate may correspond to acceleration/deceleration. Although the S-Curve controller may take the acceleration/deceleration into account, it is still possible that the overall control signal may change too fast due to other reasons, such as tracking error feedback, disturbances, stick friction compensation, and so on. In order to avoid exceeding the servo system capacity and for smooth motion, the control signal change rate may be limited. That is, if the difference between the current and previous control commands exceeds a threshold, the current command may be limited so that the difference is saturated at the threshold.

A second step of the protection procedure may be to limit the control signal. Both the DAC and the servo system may be capable of receiving only limited control signal input up to a maximum amount. If the current control command exceeds this threshold, then steps may be taken to saturate the current control command to the maximum control input.

One embodiment of a method of trajectory motion control of the present invention is shown in pages 1-16 of the TBC Flowcharts and pages 1-5 of the TBC Kernel Flowcharts of the attached Appendix I. The step indicators listed in TBC Kernel Flowcharts 4 correspond to the steps in FIG. 18.

While this invention has been described as having an exemplary design, the present invention may be further modified within the spirit and scope of this disclosure. This application is therefore intended to cover any variations, uses, or adaptations of the invention using its general principles.

What is claimed is:

1. A method of generating a trajectory for a body, including the steps of:

identifying a plurality of line segments included within the trajectory;

compressing at least a portion of the plurality of line segments;

smoothing at least a portion of the plurality of line segments by converting the portion of line segments into a plurality of arcs which remain within a tolerance relative to the trajectory, wherein the portion of the plurality of line segments includes at least two line segments, wherein the body is a cutting tool of a CNC machine, wherein the compressing step includes the steps of determining a starting point of a first line segment, determining an ending point of a second line segment, replacing the first line segment and the second line segment with a third line segment that begins at the starting point and ends at the ending point if a plurality of conditions are satisfied; and moving the cutting tool of the CNC machine based on the plurality of arcs.

2. The method of claim 1, wherein the plurality of conditions includes a distance limit between the starting point and the ending point.

3. The method of claim 1, wherein the plurality of conditions includes an angle limit on an angle formed by the first line segment and the second line segment.

4. The method of claim 1, wherein the plurality of conditions includes a tolerance requirement for tolerances associated with the starting point, the ending point, and a common point.

5. The method of claim 1, wherein the plurality of conditions includes a perpendicular distance limit on the perpendicular distance between a common point and the third line segment.

6. The method of claim 5, wherein the perpendicular distance limit is smaller than a tolerance associated with the common point.

7. A method of generating a trajectory for a body, including the steps of:

identifying a plurality of line segments included within the trajectory;

smoothing at least a portion of the plurality of line segments by converting the portion of line segments into a plurality of arcs which remain within a tolerance relative to the trajectory, wherein the portion of the plurality of line segments includes at least two line segments, wherein the body is a cutting tool of a CNC machine, wherein the smoothing step includes the steps of identifying a plurality of points that define the plurality of line segments, and adjusting the position of at least a portion of the plurality of points such that the plurality of arcs pass through the plurality of points and define a portion of the trajectory, the portion of the trajectory having a gradually changing curvature; and moving the cutting tool of the CNC machine based on the plurality of arcs.

8. The method of claim 7, wherein a first arc of the plurality of arcs joins a second arc of the plurality of arcs at a point wherein the first and second arcs are mutually tangential.

9. The method of claim 7, further including the steps of:
calculating the trajectory;
calculating the tolerance; and
calculating a feedrate associated with the trajectory.

10. The method of claim 9, wherein the calculating the trajectory step includes the steps of reading from a part program locations of a plurality of points and interpolating between the plurality of points to define the trajectory.

11. The method of claim 10, wherein the part program includes a plurality of NC motion commands and a plurality of NC tolerance commands.

12. A method of generating a trajectory for a body, including the steps of:

identifying a plurality of line segments included within the trajectory;

smoothing at least a portion of the plurality of line segments by converting the portion of line segments into a plurality of arcs which remain within a tolerance relative to the trajectory, wherein the portion of the plurality of line segments includes at least two line segments, wherein the body is a cutting tool of a CNC machine, wherein the smoothing step includes the steps of identifying a plurality of points that define the plurality of line segments, and adjusting a position of at least a portion of the plurality of points such that the plurality of arcs pass through the plurality of points and define a portion of the trajectory, the plurality of arcs being circular arcs; and moving the cutting tool of the CNC machine based on the plurality of arcs.

13. A method of generating a trajectory for a body, including the steps of:

identifying a plurality of line segments included within the trajectory;

smoothing at least a portion of the plurality of line segments by converting the portion of line segments into a plurality of arcs which remain within a tolerance relative to the trajectory, wherein the portion of the plurality of line segments includes at least two line segments, wherein the body is a cutting tool of a CNC machine; and moving the cutting tool of the CNC machine based on the plurality of arcs, wherein the smoothing step includes the steps of preparing for smoothing, adjusting for smoothing, and smoothing using a double arc algorithm and the preparing for smoothing step includes the steps of identifying a first point, a second point adjacent the first point, and a third point adjacent the second point that together define a portion of the trajectory, determining an arc that passes through the points, determining a first line segment between the first and second points, calculating a first shortest distance between a midpoint of the first line segment and the arc, determining a second line segment between the second and third points, calculating a second shortest distance between a midpoint of the second line segment and the arc, and marking the second point for smoothing if the first and second shortest distances are both less than a predetermined distance, and an angle formed by the first and the second line segments is greater than a predetermined angle.

14. The method of claim 13, wherein the preparing for smoothing step includes the step of marking points that together define a portion of the trajectory as either suitable for smoothing or unsuitable for smoothing, depending upon whether a plurality of conditions are satisfied.

15. A method of generating a trajectory for a body, including the steps of:

identifying a plurality of line segments included within the trajectory;

smoothing at least a portion of the plurality of line segments by converting the portion of line segments into a plurality of arcs which remain within a tolerance relative to the trajectory; and moving the cutting tool of the CNC machine based on the plurality of arcs, wherein the smoothing step includes the steps of preparing for smoothing, adjusting for smoothing, and smoothing using a double arc algorithm and wherein the adjusting for smoothing step includes the steps of:
   identifying four adjacent points that together define a portion of the trajectory,
   determining a first construction arc that passes through the first, second, and fourth points and lies in a first plane,
   determining a second construction arc that passes through the first, third and fourth points and lies in a second plane,
   determining a first vector extending from the second point to a first end point on the second construction arc that is closest to the second point,
   determining a second vector extending from the third point to a second end point on the first construction arc that is closest to the third point,
   adjusting the second point a first adjustment distance along the first vector if the second point has been marked as suitable for smoothing and at least one of the first and third points has been marked as suitable for smoothing, and
   adjusting the third point a second adjustment distance along the second vector if the third point has been marked as suitable for smoothing and at least one of the second and the fourth points has been marked as suitable for smoothing, wherein the body is a cutting tool of a CNC machine.

16. The method of claim 15, wherein the step of determining a first vector includes the steps of
   determining a first center point of a circle defined by the second construction arc,
   determining a first projection point that defines a line with the second point that is perpendicular to the second plane, and
   locating the first end point by determining a line that passes through the first center point and the first projection point and intersects the second construction arc.

17. The method of claim 15, wherein the step of determining a second vector includes the steps of
   determining a second center point of a circle defined by the first construction arc,
   determining a second projection point that defines a line with the third point that is perpendicular to the first plane, and
   locating the second end point by determining a line that passes through the second center point and the second projection point and intersects the first construction arc.

18. The method of claim 15, wherein the adjusting for smoothing step is performed a plurality of times on a plurality of sets of four adjacent data points, each set sharing three data points with a prior set and a subsequent set.

19. The method of claim 15, wherein the first adjustment distance is a product of a first value times a length of the first vector if only one of the first and third points has been marked as suitable for smoothing, and the first adjustment distance is a product of a second value times the length of the first vector if both of the first and third points have been marked as suitable for smoothing, the second value being smaller than the first value.

20. The method of claim 19, wherein the first value is approximately equal to 0.5 and the second value is approximately equal to 0.19.

21. A method of generating a trajectory for a body, including the steps of:
   identifying a plurality of line segments included within the trajectory;
   smoothing at least a portion of the plurality of line segments by converting the portion of line segments into a plurality of arcs which remain within a tolerance relative to the trajectory; and
   moving the cutting tool of the CNC machine based on the plurality of arcs,
   wherein the smoothing step includes the steps of preparing for smoothing, adjusting for smoothing, and smoothing using a double arc algorithm and wherein the smoothing using a double arc algorithm step includes the steps of
   determining a desired tangent vector for each of a plurality of points processed by the adjusting for smoothing step, and
   generating double arcs to replace a first line segment between a first point and a second point and a second line segment between the second point and a third point, wherein a first arc of the double arcs is tangent to a first desired tangent vector at the first point and a second arc of the double arcs is tangent to a second desired tangent vector at the third point, the first arc and the second arc being tangent to each other, wherein the body is a cutting tool of a CNC machine.

22. The method of claim 21, further including the step of determining whether the double arcs are valid by comparing a distance from the second point to a closest arc of the double arcs to a predetermined distance.

23. The method of claim 22, wherein if the double arcs are not valid, then generating a second pair of arcs that pass through the first point, the second point, and an intermediate point between the first and second points.

24. The method of claim 23, further including the step of determining whether the second pair of arcs are valid by comparing a distance from the intermediate point to a line segment extending between the first and second points to a predetermined distance.

25. The method of claim 24, wherein if the second pair of arcs are not valid, then defining a portion of the trajectory between the first and second points as a line segment.

26. A method of generating a trajectory for a body, including the steps of:
   identifying a plurality of line segments included within the trajectory;
   smoothing at least a portion of the plurality of line segments by converting the portion of line segments into a plurality of arcs which remain within a tolerance relative to the trajectory, wherein the smoothing step includes the steps of preparing for smoothing, adjusting for smoothing, and smoothing using a double arc algorithm and wherein the adjusting for smoothing step includes the steps of:
   identifying four adjacent points that together define a portion of the trajectory,
   determining a first construction arc that passes through the first, second, and fourth points and lies in a first plane,
   determining a second construction arc that passes through the first, third and fourth points and lies in a second plane,
   determining a first vector extending from the second point to a first end point on the second construction arc that is closest to the second point,
   determining a second vector extending from the third point to a second end point on the first construction arc that is closest to the third point, adjusting the second point a first adjustment distance along the first vector if the second point has been marked as suitable for smoothing and at least one of the first and third points has been marked as suitable for smoothing, and adjusting the third point a second adjustment distance along the second vector if the third point has been marked as suitable for smoothing and at least one of the second and the fourth points has been marked as suitable for smoothing, and moving the body based on the plurality of arcs, wherein the body is a cutting tool.

27. A method of generating a trajectory for a body, including the steps of:

identifying a plurality of line segments included within the trajectory; and smoothing at least a portion of the plurality of line segments by converting the portion of line segments into a plurality of arcs which remain within a tolerance relative to the trajectory, wherein the smoothing step includes the steps of preparing for smoothing, adjusting for smoothing, and smoothing using a double arc algorithm and wherein the smoothing using a double arc algorithm step includes the steps of determining a desired tangent vector for each of a plurality of points processed by the adjusting for smoothing step, generating double arcs to replace a first line segment between a first point and a second point and a second line segment between the second point and a third point, wherein a first arc of the double arcs is tangent to a first desired tangent vector at the first point and a second arc of the double arcs is tangent to a second desired tangent vector at the third point, the first arc and the second arc being tangent to each other, and moving the body based on the double arcs, wherein the body is a cutting tool.

* * * * *